Oct. 31, 1967
W. W. BUECHNER
3,349,685
PHOTOGRAPHIC TIMER AND METHOD OF TIMING
PHOTOGRAPHIC TREATING PROCESSES
Filed Aug. 19, 1963
4 Sheets-Sheet 1
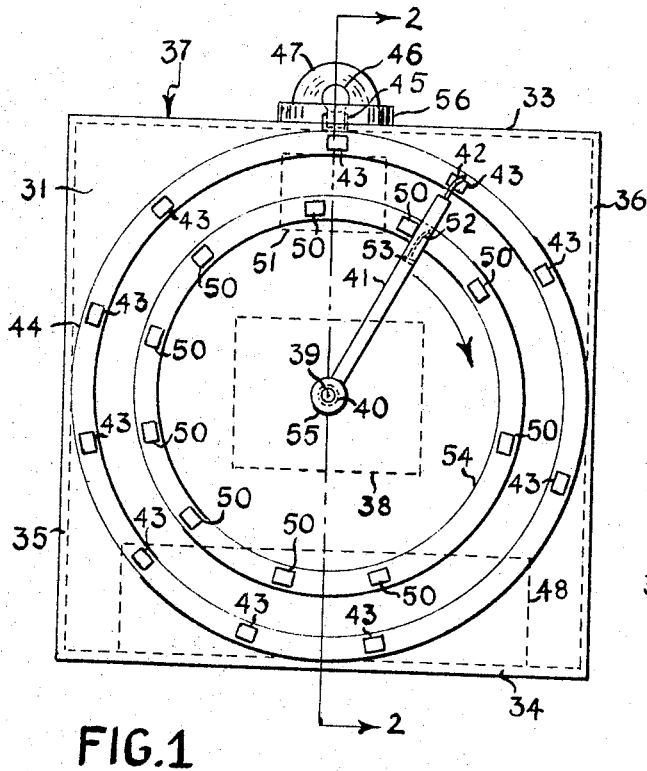
FIG.1
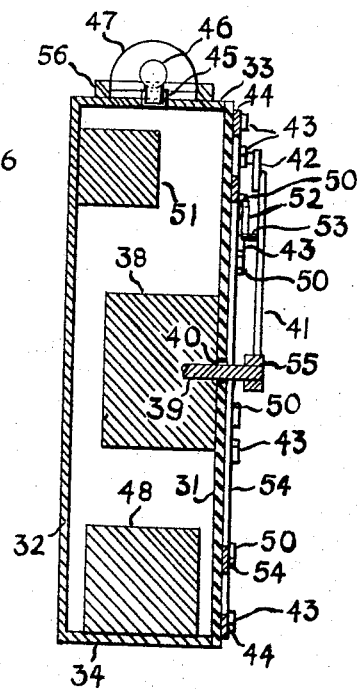
FIG.2
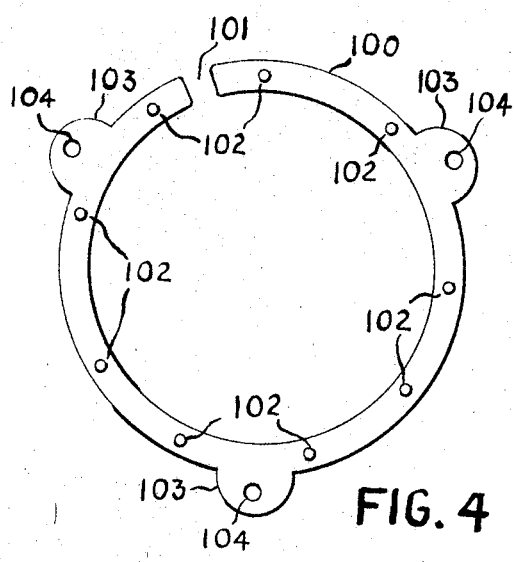
FIG.4
FIG.3
INVENTOR.
Werner W. Buechner Oct. 31, 1967 W. W. BUECHNER 3,349,685
PHOTOGRAPHIC TIMER AND METHOD OF TIMING
PHOTOGRAPHIC TREATING PROCESSES
Filed Aug. 19, 1963 4 Sheets-Sheet 2

INVENTOR.
Werner W. Buechner

Oct. 31, 1967 W. W. BUECHNER 3,349,685
PHOTOGRAPHIC TIMER AND METHOD OF TIMING
PHOTOGRAPHIC TREATING PROCESSES
Filed Aug. 19, 1963 4 Sheets-Sheet 3

INVENTOR.
Werner W. Buechner

Oct. 31, 1967
W. W. BUECHNER
3,349,685
PHOTOGRAPHIC TIMER AND METHOD OF TIMING PHOTOGRAPHIC TREATING PROCESSES
Filed Aug. 19, 1963
4 Sheets-Sheet 4
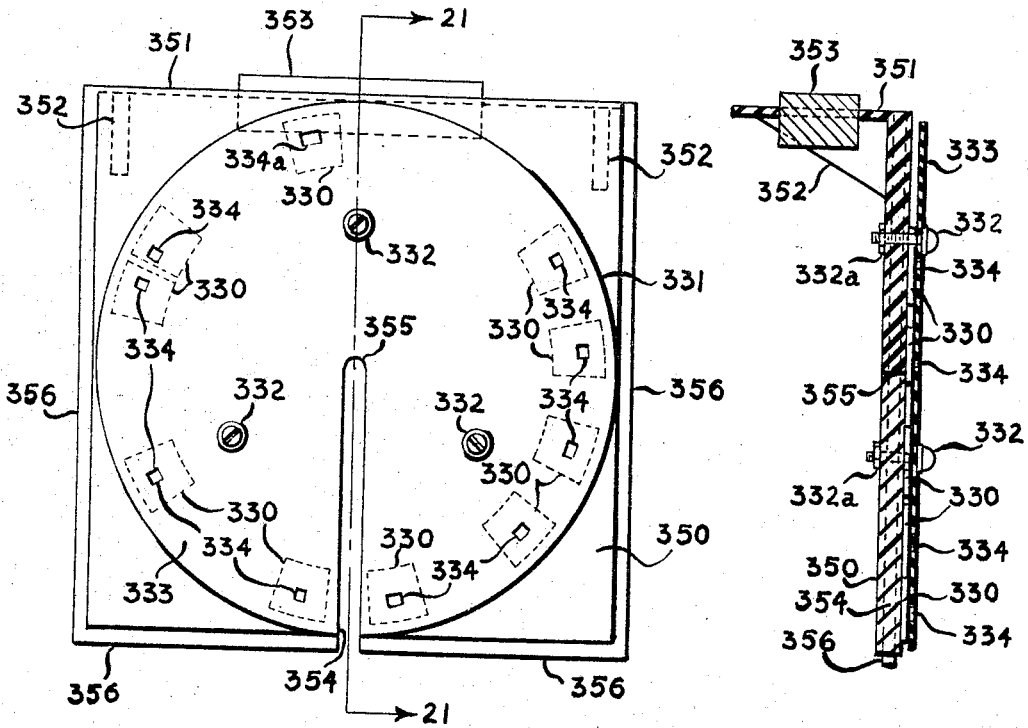
FIG. 20
FIG. 21
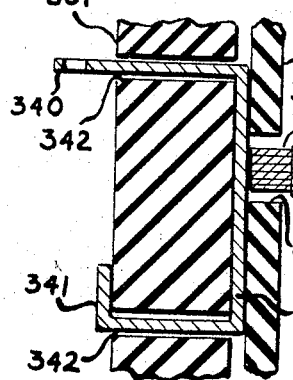
FIG. 22
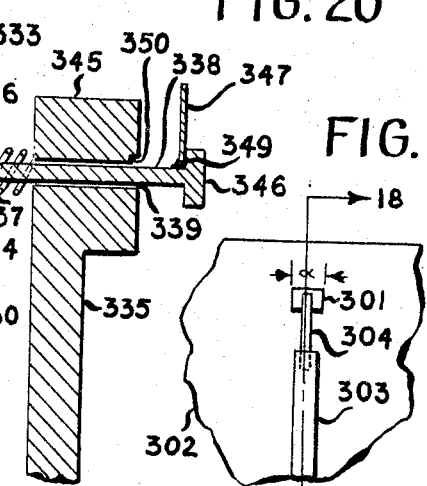
FIG. 17
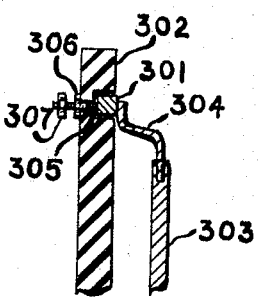
FIG. 18
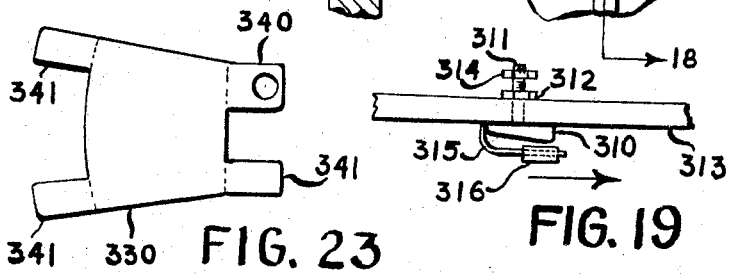
FIG. 23
FIG. 19
INVENTOR.
Werner W. Buechner

United States Patent Office 3,349,685
Patented Oct. 31, 1967

3,349,685
PHOTOGRAPHIC TIMER AND METHOD OF TIMING PHOTOGRAPHIC TREATING PROCESSES
Werner W. Buechner, 4407 Gladding Court, Midland, Mich. 48640
Filed Aug. 19, 1963, Ser. No. 302,902
32 Claims. (Cl. 95—89)

The present invention relates to a timer for the timing of photographic multistep treating processes.

This application is a continuation-in-part of my copending application Ser. No. 23,313 filed on Apr. 19, 1960, now Patent No. 3,124,051, and of my copending application Ser. No. 52,524, filed on Aug. 29, 1960, now Patent No. 3,236,649.

The manufacturers of the various photographic color materials recommend for the timing of the respective batch processes, practiced in the production of colored negatives or positives by the amateur, the use of the standard timers having a sweeping second and minute hand.

The commercially available timers made specifically for use in photographic darkroom work are accurate and permit excellent control of developing and treating times in the various photographic processes. Their use with the complex color processes requires that the operator is skilled and experienced in their use and that he is willing to devote his full attention to the observation of the timer for the full duration of all the steps of the process. He must remember the length of time, required for each step of the particular process he carries out, he must add up seconds and minutes, compute total and partial treating times, consider drainage times, transfer his material from step to step and agitate at a uniform, predetermined rate during the treatment. Any error in the computation of treating times, or in the selection of the time period required for any specific treating step will invariably result in less than a perfect result.

Many of the darkroom amateurs who are occasionally devoting a few hours to their darkroom work usually do not have, and are not willing to acquire, the skill and routine needed for trouble-free and correct timing of the complex modern color developing processes. Quite often they are discouraged by the complexity of the operation and particularly by the complex timing requirements, and return, after a few trial runs with the color material, to the much simpler and less demanding techniques used in the processing of black and white materials.

Even the skilled professional has found that the use of standard photographic timers introduces severe limitations in the number of batches of materials which one operator can handle simultaneously and sequentially in the same trays or vessels so as to better utilize his equipment capacity. Running one batch at a time through a given set of equipment severely limits the daily output of the operator with the complex, long lasting multistep color processes which may require up to one hour or more processing time. Using higher capacity equipment requires a larger capital investment and larger outlay for treating chemicals, unless the capacity is fully utilized at least most of the time. Designing the capacity of the equipment in accordance with peak demands, such as they may occur after weekends or holidays is thus not economical.

On the other hand, running two or more batches sequentially at the highest possible throughput rate in a given set of undersized equipment would permit the increase of the treating capacity of the available equipment to several times the basic capacity. The operation of complex color developing processes, in sequentially overlapping and simultaneous fashion by one and the same operator requires, however, considerable skill and experience of the operator, even if he uses more than one timer. As the number of batches, processed simultaneously but at different stages of the process schedule, increases, the simultaneous observation of all the different stages in the time schedules becomes extremely difficult and tiring and costly errors and mistakes can not always be avoided.

There is thus a need for a timer which permits the unskilled photographic amateur or beginner to follow through, faithfully and accurately, with any of the time schedules of the complex color processes without devoting too much of his attention to the timing part of the operation. There is also a need for a timer which permits the professional to utilize his equipment capacity fully at all times by passing a multiplicity of batches through his equipment simultaneously and sequentially at the fastest possible rate yet requiring only one operator for the handling of this phase of the work.

Accordingly, it is an object of the present invention to provide a novel timer for the timing of complex multistep photographic processes which signals to the operator the termination of each step and the start of each following step in a series of successive photographic treating steps.

It is a further object of the invention to provide an accurate timer which permits the simultaneous timing of a multiplicity of batches of photographic material being treated simultaneously in successive phasing and being at any one time at different stages of the time schedule of the particular process.

It is another object of the invention to provide a photographic timer which can be directly used for the control of automatic forwarding equipment used in the practice of complex color developing processes.

It is still another object of the present invention to provide a universal timer which answers the need for a timer, specifically adapted to the requirements of present day color developing processes for the purposes of the amateur as well as of the professional.

Other objects of the invention will become apparent from the following description of the invention and from the accompanying drawings.

Generally, the objects of the invention are accomplished by providing in a timing device means which are programmed to the time schedule of a succession of photographic treating steps or of at least one multistep photographic process, respectively, and which are capable of producing a succession of impulses at predetermined time intervals corresponding to the timing schedule required for the carrying out of said succession of photographic treating steps or of said photographic process, respectively.

The most preferred embodiment of the timer of the present invention comprises a multiplicity of contact means, which are programmed to the predetermined time schedule of the succession of photographic treating steps to be timed or controlled by the timer, with at least one counter-contact means adapted to cooperate with the said contact means, and with means adapted to cause engagement and disengagement of said contact means and counter-contact means at time intervals corresponding to the predetermined time schedule of said succession of treating steps.

The term "timer" as used herein means any apparatus, device or assembly which is designed to or capable of recording or indicating the passage of time.

The term "program timer" is meant to designate a timer which indicates the passage of predetermined periods of time and particularly a succession of a multiplicity of definite, predetermined time periods of equal or different lengths, as the case may be.

The term "programmed" is intended to indicate that the means provided in the timer for the recording and indicating of the predetermined periods of time are arranged in such manner that the time schedule indicated by the timer corresponds to a meaningful time schedule composed of distinct time periods or fractions of the total treating time required for the carrying out of a photographic treating process comprising two or more steps and preferably more than five steps or of a succession of an equal number of steps, respectively, forming part of such process. The preferred embodiment of the "programmed" timer will not only provide an indication of the exact length of the time periods corresponding to each of the steps but will also provide and give an indication of the order in which the steps are to be carried out.

The expression "photographic treating process" as used herein is meant to stand for any multistep treatment to which a photographic material may be subjected for the purpose of producing an image on said photographic material. The term thus covers particularly also the procedures which are popularly referred to as "developing a negative" or "developing prints, enlargements, copies etc." The term thus encompasses the various multistep processes available for the production of negative and positive images on the various photographic materials from a latent image contained thereon. It includes not only the developing steps proper but also the various fixing, stabilization, washing, extraction and other steps which are performed with a view toward a finished representation of an image on such materials.

The term is referring, particularly also to the various color processes including the methods for producing colored negatives or positives on multilayer positive, negative or reversal materials. The term is not restricted to apply only to a complete series or succession of steps making up a full multistep treating process but applies to any portion of such successive treatments, provided it comprises a multiplicity of steps.

The expressions "contact means" and "counter-contact means" are intended to designate cooperating means which by mechanical, electronic or other principles or by a combination of such principles produce an impulse when they are brought to touch, contact or approach each other or when such contact between the contact means and counter-contact means is interrupted. The establishment of mechanical or electronic contact between a contact means and a counter-contact means is called herein "engagement." The interruption of existing mechanical or electronic contact is called "disengagement." Engagement and disengagement of a given pair of a contact means and a cooperating counter-contact means may be brought about by movement of the contact means relative to the stationary counter-contact means, or by movement of the counter-contact means relative to the stationary contact means. Alternatively, both the contact means and the counter-contact means may be in motion relative to each other or both may be stationary. In the latter instance, engagement and disengagement between the contact and counter-contact means is brought about by the use of movable auxiliary programming means which by mechanical or electronic means make or break the contact between or permit engagement and disengagement of the coordinated contact and counter-contact means.

The means which are connected mechanically or electronically to the means used to time or control the process steps are called herein the "contact means," the contacting means which activate or deactivate the contact means which activate or deactivate the contact means in accordance with the time schedule programmed in the timer are called the "counter-contact means." As is readily apparent from the foregoing the "program" in the timer may be established by either using a multiplicity of "contact means" physically arranged such that by the motion of the set of contact means relative to the counter-contact means or by motion of the counter-contact means relative to the contact means or by a composite motion the impulse is produced by engagement or disengagement of the countercontact means in succession with the coordinated contact means. Alternatively, the said auxiliary programming means used to engage or disengage a pair of coordinated contact means and counter-contact means may contain the "program" by approximately spacing thereon in accordance with the desired time schedule of the impulses the means capable of bringing about the engagement or disengagement of the contact and counter-contact means. The number of contact means may be a minimum of one. Likewise a minimum of one counter-contact means is required. Any combination of one or more of each of the contact and counter-contact means is possible, depending on the desired effects and versatility, and on the presence or absence of other auxiliary programming means. The motion of either of the contact means, counter-contact means or auxiliary programming means relative to the others, is advantageously at a constant uniform rate, though the invention is not restricted thereto.

The means employed to support or hold the contact means, counter-contact means or the auxiliary programming means are called herein "carrier means." They may also serve as the means to produce the motion of any one or more of these means in a predetermined path at a predetermined rate.

The contact means programmed in the timer of this invention to the time schedule of a given succession of treating steps are conveniently and advantageously mounted or contained on one common carrier means. Likewise, the counter-contact means are preferably contained on a second independent carrier means. If more than one counter-contact means is provided in the timer, they may be contained on one common carrier means or on more than one separate carrier means. If one correlated counter-contact means is provided for each contact means, it was found most advantageous to contain each of the counter-contact means on a separate coordinated carrier means.

In order to facilitate the observation of the time schedule provided by the timer, it is for many uses preferred that the timer comprises in addition means for translating said engagement and disengagement of the contact and counter-contact means into a readily perceptible signal. Among the many suitable signal sources are preferred, for the purposes of the invention, those signal sources which produce signals which can be perceived by visual observation. These are primarily means adapted to produce light signals, usually incandescent bulbs or similar light sources or for more specialized applications mechanical means, which by a change in their relative position, e.g. by being raised or lowered, retracted or projected relative to their support, can serve as an excellent signal. The signal produced by the latter type of signal source may also be perceived by the feel of the hands. They are of particular importance for use with treating processes which are carried out in absolute darkness or for use by blind operators. If these mechanical signals are provided with luminescent materials, which, depending on their relative position, are alternatingly exposed or covered, this type of mechanical signal source becomes a source of light signals in the meaning of the term.

A second major group of signal sources useful in the timer of the present invention comprises those which generate sonic or acoustical signals. Preferred among this group are the bells and buzzers and similar devices which may be either electrically operated or which may be mechanical devices operating by the use of solely mechanical principles e.g. by the use of springs, spring motors or other similar devices.

A still higher degree of versatility is readily achieved in the program timer of the invention, if two or more of the different types of signal sources are combined in one and the same timer. Greater convenience for the operator can, for instance, be achieved by the provision of both light and sonic signals in the timer.

Each timer may be provided with only one single signal source of a given type or kind, or it may be operated with a multiplicity of signal sources of identical type and kind which may be contained on or in the timer. As their number increases its was found to be more advantageous to place the signal sources physically in a position away from the timer and in close proximity with the tray or vessel in which the individual treating steps, time or controlled by the respective signal sources, are carried out.

The means adapted to cause alternatingly engagement and disengagement of contact means and counter-contact means may operate on a purely mechanical basis and may be part of and driven and activated by a mechanical assemblage provided for the agitation of the photographic materials relative to the treating solutions. More advantageously the said means are part of an assemblage driven by a clockwork and preferably by an electric clockwork or a synchronous motor.

The contact means and counter-contact means are actually part of an electric circuit, which is called herein the primary circuit. The contact and counter-contact means are thus, in this preferred embodiment of the timer electrical contacts in the usual meaning of the term. The flow of electric current in the primary circuit or the interruption of the flow of electric current is controlled in this embodiment of the timer by the engagement and disengagement of the contact and/or counter-contact means. The signal source or sources operate advantageously and conveniently on the same circuit or, if desired, on a separate secondary circuit which may be operated by a relay or similar device. The signal sources may also operate on a non-electrical, purely mechanical principle. In either alternative the signal source or sources are advantageously directly or indirectly controlled by the said primary circuit.

The contact means may be contained on the coordinated carrier means in a variety of different ways. They may be arranged in a straight line in a common plane or they may form a circle contained on the face of the timer thus forming a dial, or they may be arranged in form of a circle on the inner or on the outer periphery of a cylindrical carrier means. It is usually preferred that the carrier means containing the contact means are stationary. The carrier means containing the counter-contact means are advantageously movable and correlated, so that the counter-contact means travel in a path coinciding with the configuration of the arrangement of the series of contact means.

In some embodiments of the timer, the counter-contact means may be stationary and the contact means are movable relative to the former, as in the case where the contact means are mounted on a traveling belt.

As stated, only one counter-contact means is needed for the operation of the timer. However, for some applications, two or more counter-contact means are required up to a number equaling that of the contact means or higher. If more than one counter-contact means is provided it is preferable, that each counter-contact means is capable of being independently activated or deactivated. This may be achieved by simple mechanical means, such as dislocating the counter-contact means from their normal plane or path of travel or by electrical switching means designed to close or break the primary circuit.

The program timer of the present invention permits timing and controlling of photographic treating processes, having any desired number and order of steps and any desired duration of the individual steps and of the sequences of steps making up the treating process. The actual timing or control may be achieved, as stated, by the utilization of optical and/or acoustical signal sources or by the direct and automatic control of forwarding means. The use of the optical or acoustical signals requires the operator, when he observes the appearance or disappearance of the signal or signals, to forward the photographic material to be treated into the next treating vessel or tray or to change the treating fluid or liquid in the vessel or tray, replacing it by the fluid or liquid to be used in the next step of the multistep treating process.

As stated, the program timer may also be used with advantage in fully automatic, discontinuous operation which does not require the assistance of an operator for the actual forwarding of the individual batches of photographic material through the individual steps of the process. Means for achieving automatic forwarding of the batches of material are described, for instance, in my copending application Ser. No. 342,029, filed Feb. 3, 1964.

Both in the manual and automatic mode of operation of the photographic process, the program timer of the invention may also be adapted to provide impulses or signals for more complex operations or timing schedules including timed drainage times of exactly predetermined duration between the individual steps. This embodiment of the invention is of particular importance in its application to modern multistep color-processes providing not only exact timing of the individual processing steps in a multiplicity of treating baths and intermediary washing steps but also the exact timing of the drainage times required between each of the treating steps in the manual or fully automatic operation.

The program timer of the invention may be constructed so as to time or control the treatment of one single batch of photographic material at a time or it may be adapted to time or control the simultaneous sequential treatment of two or more batches of photographic material being carried through a series of treatment vessels in sequence and in overlapping fashion.

The timer may be designed to contain only one specific fixed timing cycle or program for one single predetermined multistep treating process such as is required for a given type and manufacture of photographic material. However, more advantageously an embodiment of the timer is used which permits ready adjustment of the timing cycle to accommodate more than one type of material or processes. By making the contact means freely adjustable in relation to each other, the operator may produce on a given multistep program timer any desired timing schedule or program, accommodating the sequences and time cycles for an unlimited number of different photographic materials and treating processes.

A more advanced embodiment of the program timer of the invention contains a multiplicity of sets of coordinated contact means programmed for different photographic treating processes, which by mechanical or electrical means, may be switched in or out of operation so that only one of the series of contact means is active. Any desired number of different treating patterns may be provided in this manner in one and the same program timer. By simply dialing or switching in a series of contact members, programmed for the photographic material to be treated, the operator may time any one of a number of programmed multistep treating processes without loss of accuracy and reliability and without the need of acquiring more than one timer.

This embodiment of the timer has the advantage that the operator need not concern himself with the details of setting up a program schedule thus eliminating a source of error. The use of a fixed pattern of programmed contact means also greatly improves the accuracy and reproducibility of the final results achieved in the timed process.

The convenience and advantages of having available in one timer a multiplicity of programs for different photographic treating processes may also be achieved by adapting the timer to receive exchangeable assemblies containing one or more series or sets of coordinated contact means, each set or series programmed to one of the photographic processes to be timed or controlled by the timer. The operator need only insert into the timer the assemblage, programmed and labeled for the particular process, and by operation of the timer in the usual manner, he will time accurately and reproducibly the selected process.

Advantageously, means may be provided which permit readily the setting or resetting of the program timer to or close to the beginning of a treatment cycle or to any desired length of time preceding a treatment cycle. Examples of this important feature are ratchet assemblages and similar devices known per se as components of clocks and timers, the use of which will be described hereinafter in connection with various specific embodiments of the program timer of the invention. The invention is, however, not limited to these specific embodiments and any other suitable means for the resetting of the time cycle as it may come to mind may be used in accordance with the teaching of this invention.

Particularly great benefits are achieved by the use of the program timer in conjunction with the light bar of the present invention which contains for each step of the multistep treating process at least one light source. The light sources contained in the light bar are preferably arranged and spaced so that each light source is in juxtaposition with the respective treating vessel or tray in which the step, to be controlled by the particular light signal, is carried out. Each of the light sources is in turn independently controlled by the program timer in accordance with the time schedule of the process.

The specific advantages and improvements achievable by the use of the various embodiments of the timer and method of the present invention are set out hereinafter in connection with the detailed description of the invention.

Referring to the accompanying drawings,

FIG. 1 is a front elevation and FIG. 2 a vertical section taken along line 2—2 of FIG. 1 of one embodiment of the timer of the present invention.

FIG. 3 is a front elevation of part of a dial or face useful in combination with the timer of the present invention.

FIG. 4 is a front elevation of a programmed contact ring useful in the timer of the invention.

Figure 5:
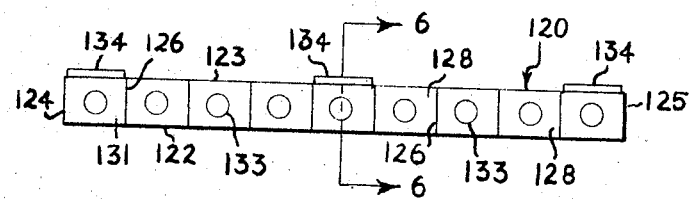
FIG. 5 represents a schematic top plan view of a light bar.

FIG. 17 represens a fragmentary front elevation and FIG. 18 a fragmentary vertical sectional view taken along line 18—18 of FIG. 17 of part of a dial face provided with a preferred embodiment of a combination of contact and cooperative counter-contact.

FIG. 19 is a fragmentary top plan view of part of a dial or face of a timer provided with still another embodiment of a combination of the contact and cooperating counter-contact.

FIG. 20 is a front elevational view of another embodiment of the exchangeable dial assemblage and FIG. 21 represents a vertical section thereof taken along line 21—21 of FIG. 20.

FIG. 22 is a fragmentary vertical section of still another embodiment of a combination of contact and cooperating counter-contact which may be used with particular advantage in the timer of the invention.

FIG. 23 is a top plan view of a blank useful in the manufacture of the contact assemblage shown in FIG. 22.

In the following description of the invention only a few of the many basic construction and design principles of the program timer explained hereinbefore have been set out and demonstrated in a few specific embodiments without any intent of limiting the invention to the embodiments, illustrated and described hereinafter in detail. It is within the scope of the present invention that each of the basic designs shown herein is combined with one or more of the operational principles, auxiliary means or modifications, explained hereinafter to produce a new useful embodiment of the timer of the invention, providing the exact degree of simplicity or versatility and economy of construction and the degree of operational versatility, desired or needed by the operator. It is this versatility in construction, economy and operation which makes the program timer of the invention superior to those of the prior art which lack the versatility required for the timing of the complex discontinuous multistep color processes.

In my copending applications Ser. Nos. 23,313 and 52,524 are described certain improvements in the methods of treating photographic materials in the multistep photographic processes, and particularly in the color developing processes, as well as novel apparatus for carrying out said processes.

The timer of the present invention may be readily adapted to be used directly with these processes and apparatus.

An inexpensive, simple yet very efficient embodiment of the program timer operating on the electronic principle and employing a fixed contact-rotating hand-counter-contact-arrangement and one signal source is depicted in FIGS. 1 and 2 of the accompanying drawings.

Face or dial 31, back 32, top 33, bottom 34 and sides 35 and 36 are joined to form housing 37. To the inside of face 31 is mounted clockwork 38 having shaft 39. The free end of shaft 39 extends through circular opening 40 provided in the center of the face plate. Hand 41 is mounted on the free end of shaft 39 so as to rotate clockwise with the shaft 39 driven by the clockwork. The free end of hand 41 is provided with flexible contact tongue 42. To the front of face 31 is mounted ring 44 which holds a multiplicity of rectangular contacts 43, programmed to a multistep photographic treating process, the free ends of which extend outwardly from the face plate 31 beyond the plane of rotating hand 41 and tongue 42 and in a circle somewhat smaller than that described by the free tip of tongue-like counter-contact 42 on its travel around the face 31.

On the top of housing 37 is mounted socket 45 containing bulb 46 which is enclosed by removable dome 47 of a transparent material which is set light-tight in ring 56 mounted on top of housing 37. The dome 47 is made of transparent material colored in such manner that it substantially retains all light of wave lengths harmful to the photographic material the processing of which is to be timed by the timer. It is advantageously made of the materials and contains the dyes used in the safe-light filters recommended for use with the particular photographic material. To permit handling of a variety of photographic materials with the program time the dome is readily removable and exchangeable with like transparent domes of suitable safe-light characteristics.

The face is made of a material which is a non-conductor for electricity so that contact ring 44 and contacts 43 are insulated from clockwork 38 and hand 41 and tongue 42, while clockwork 38, hand 41 and tongue 42 are made from an electrically conducting material, advantageously from metal.

Hand 41 and tongue 42 are conductively joined to each other and to shaft 39. The body of clockwork 38 is connected to the minus pole of battery 48 contained in the housing 37. One terminal of socket 45 is connected by wire to the plus pole of the battery. When counter-contact 42, upon its travel around the face of the timer, touches or engages with any of the contacts 43, the primary circuit will be closed, causing bulb 46 to light up. As hand 41 and counter-contact 42 continue to travel the circuit will be opened when counter-contact 42 disengages or loses contact with the contact 43. As hand 41 continues its travel the circuit will be closed again when counter-contact 42 contacts the next contact causing bulb 46 to light and so forth. The contacts are spaced around contact ring 44 in such manner that the bulb 46 lights at the scheduled begin of each new step, i.e., after the passage of the exact time required for the completion of the preceding treating step. The width of the contacts, in the direction of travel of the counter-contact, corresponds to the drainage times between individual steps.

The number and spacing of contacts 43 shown in FIG. 1 correspond to the time schedule presently recommended for the complete treatment of Kodak's Ektacolor Positive Printing Paper. Advantageously, one additional contact is provided at the begin of the cycle so as to signal the begin of the first step. The number of contact means in the timer equals thus the number of steps to be timed plus one.

The clockwork 38 is conveniently an electric synchronized motor of 1 r.p.h., i.e., it completes one full turn in one hour, if the total duration of the process to be timed is one hour or less. The contacts 43 are spaced from each other by an angle which is calculated in accordance with the equation:

$$\frac{360}{A} \cdot B = X$$

A being the number of minutes required for one full revolution of the clockwork;

B being the duration of the step to be programmed in minutes; and

X being the angular spacing of the contact means or in degrees.

The upper pin 43 controlling the begin of the first step is shown in the 12 o'clock position which was found to be the most convenient and logical. However, as is readily apparent, the number one contact, i.e., the contact signaling the begin of the first treating step may also be placed in any other position of the dial face, particularly if the contact and the hand are properly marked such as by the use of luminescent paints or other luminescent materials.

In the operation of the program timer the timer is set to its starting position and the bulb 46 lights up as a result of counter-contact 41 contacting the number one contact located in the 12 o'clock position. The timer is then started. As soon as counter-contact 41 and contact 43 in the 12 o'clock position disengage, the bulb 46 extinguishes. At this moment the sheet of photographic material is inserted into the first treating bath. Thereupon the photographic material is removed from the first treating solution when the bulb lights up again, and is then inserted into the next treating solution when the bulb extinguishes again and so forth until the photographic material has been passed through all the steps making up the complete process.

If the timer is used to control the timing cycle for the processing of Kodak's Ektacolor Positive Printing Paper the width of the contacts in the direction of travel of the counter-contact is dimensioned such that it takes exactly 20 seconds from the time that the tip of the counter-contact engages with each contact until the tip has traveled over and by each contact and until it loses contact with this particular contact. In this manner the bulb lights up for exactly 20 seconds. This is the time recommended for the drainage of this particular photographic material between the individual steps.

In the operation of the timer, employing this modification and expedient of signaling in addition the drainage times as just explained, the material is removed and lifted out from each treating bath when the bulb lights up and held for drainage until the bulb extinguishes whereupon the photographic material is promptly inserted into the next treating solution. The drainage times are included and considered in the spacing of the contacts so that the full treating time programmed on the timer for each step includes the drainage time for that particular step.

By making the radius of the dial face and the length of the hand of the timer large enough, e.g., 3 to 6 inches, the accuracy of the program timer can be readily brought to be within plus minus one or a few seconds of the prescribed treating time. This accuracy is difficultly obtainable in practice with the methods of timing usually recommended for the amateur viz visual observation and adding up of treating and drainage times on a clock having continuously rotating second and minute hands. The program timer of the invention has the further advantage that any slight inaccuracy which might have been introduced in the spacing of the contacts during manufacture is fixed and constant, repeating itself on every run in which the same timer is used. Thus the consistency of the results of any process timed by the new process timer of the present invention is excellent and unsurpassed regardless of the absolute accuracy achieved in its construction. This unexpected advantage permits the use of less accurate and thus more economical production methods without detracting from the utility of the timer and from the accuracy and reliability of the results achieved with the use of the timer of the present invention.

Instead of employing in the timer a visual signal such as a light bulb or equivalent means capable of producing a light signal as shown hereinbefore, an acoustical indicator may be substituted such as a buzzer or bell or other suitable device giving an audible signal. Sonic devices actuated by electric current may with advantage be mounted on the process timer instead of the socket and bulb arrangement shown above and connected into the electric circuit in analogical manner to produce a sonic signal when the circuit is closed by the counter-contact engaging with any one of the multiplicity of contacts. If desired both sonic and visual indicator means may be provided simultaneously, both being actuated at the same time by the closing and opening of the circuit controlled by the travel of the hand.

In an even more versatile and advantageous embodiment of the program timer of the present invention, both visual and sonic indicator means are employed which, however, operate independently of each other. The light source is controlled by the counter-contact and contact arrangement carrying contacts 43 as described hereinbefore and shown in FIGS. 1 and 2. In addition a second programmed contact ring 54 is provided concentrically to the latter, having a smaller diameter than contact ring 44, on the face of the timer with programmed rectangular contacts 50 in electrical contact with contact ring 49 which in turn is conductively connected to one terminal of buzzer 51. The second terminal of buzzer 51 is connected to the plus pole of battery 48. A second flexible contact tongue 52 is removably and adjustably fastened to the back side of hand 41 by use of angular bracket 53. Contacts 50 protrude less than the clearance between hand 41 and the dial face so as to permit free passage of hand 41 over the contacts. Each of the contacts 50 is coordinated in its angular position to one of contacts 43, however, it is offset by an angular segment corresponding to the time period by which it is desired to close the buzzer circuit prior to the appearance of the light signal actuated by the closing of the circuit when counter-contact 42 contacts the corresponding contact 43. With the use of a 1 r.p.h. clockwork one minute advanced actuation of the buzzer requires a counter-clockwise offset corresponding to the time period by which it is desired to close the buzzer circuit prior to the appearance of the light signal actuated by the closing of the circuit when counter-contact 42 contacts the corresponding contact 43. With the use of a 1 r.p.h. clockwork one minute advanced actuation of the buzzer requires a counter-clockwise offset corresponding to a 6° segment, provided counter-contacts 42 and 52 are positioned on one and the same radial line. Any deviation of the second counter-contact from this radial line is to be considered separately in the calculation of the angle of offset. Thus advanced closing of the buzzer circuit may also be achieved merely by offsetting counter-contact 52 in clockwise direction or by a combination of both expedients.

In the operation of this embodiment of the program timer the buzzer will sound shortly before the termination of the treatment in each step, giving to the operator advanced warning that his attention is required. Upon the appearance of the light signal he then drains and forwards the photographic material to the next step as described hereinbefore. The provision of the auxiliary acoustical signal permits the operator to attend to other tasks, e.g., to the exposing of new sheets in the enlarger in the darkroom while the treatment in any one of the treating solutions proceeds, without requiring his attention in the interim.

An advanced buzzer or bell signal of one half to one minute gives ample warning and requires only a minimum of the operators time for timely changing the photographic material over to the next treating step. This expedient is of particular advantage if automatic actuation means are employed to keep the photographic material moving relative to the treating solution or vice versa without requiring the operator's attention to this phase of the treating process. The length of the acoustical signals may be readily varied. A short burst of sound of a fraction of a second to a few seconds will usually be sufficient.

It is recommended in most photographic processes that the treating times of one or more of the steps be increased as the solutions become more and more exhausted. This applies particularly to the first developing bath in some of the color developing processes where the prolongation of the developing time by one minute or two is recommended, every time that 10, 20 or 30% of the theoretical capacity of the bath has been exhausted. Prolongation of the developing time after the development of each large sheet or batch of sheets of photographic material by one or two minutes may be necessary, if relatively small quantities of developer are used, to obtain consistent results. This applies particularly to some of the more exacting color processes now widely used.

The program timer of the present invention may be readily adapted to manually or automatically add and indicate these extended times of treatment by the provision of additional contacts in a position situated counter-clockwise from the contact, signaling the begin of the respective step. These additional contacts are spaced counter-clockwise from the contact 43 in the 12 o'clock position by a sector corresponding to one minute, two minutes or more as the case may be. The angle of said sector will correspond to the prolongation of the treatment step required after the development of each batch as calculated by the above-given equation.

In this embodiment of the timer dial of the invention, which is exemplified in FIG. 3 of the accompanying drawings, contact ring 72 does not extend into the position of and does not include contact 74, which is the number one contact in the 12 o'clock position, nor does it extend into the position of the auxiliary contacts 75, 76 and 77. The contacts are instead directly set into the insulated face 71 and conductively connected to contacts 78 at the back of face 71. Said contacts 78 form part of a four-way single pole switch which is operated by rotation of lever 80 around pivot 83. The latter components are conductively connected by bridge 79 to contact ring 72. By rotation of contact lever 80 any one of the contacts 74, 75, 76 or 77 may be made operative by connecting it conductively to the contact ring 72 and thus to one terminal of the signal source.

The switch may be switched manually or automatically by the provision of means (not shown) which establish mechanical connection to the clockwork such as by a gear which moves the switch one notch upon each revolution of the shaft of the clockwork or hand. In starting position, that is when the operator starts with a fresh first developer solution, switch lever 80 is set over contact 78 thus activating contact 74. Upon one or two or more full revolutions of the hand of the timer (not shown), as the case may be, the switch is set by hand or automatically through suitable mechanical means by the clockwork over the contact 78 situated to the left making contact 75 operative and so forth. By obeying the signal provided by the timer, employing this expedient, the operator will automatically follow a time schedule providing gradually increased treating times for the first step in successive batches of the treating process.

In FIG. 3 is also shown auxiliary pointer 81 which is set in pivot point 83 and located directly above and coupled to contact lever 80 of the switch. Pointer 81 thus permits the operator to observe and determine which of the contacts 74, 75, 76 or 77 is operative at any one time. For manual operation knob 82, which is joined to lever 80 and pointer 81 and which rotates in pivot 83 permits ready adjustment and switching of lever 80 to the desired contact.

As needed, more than three auxiliary contacts may be provided. Another set of contacts insulated from the upper set and from each other may be provided on the circle of the contacts controlling the acoustical signal so that the same switch or a second similar switch co-operates also with this set of contacts, providing also a gradual advance of the appearance of the auxiliary sonic signal signaling the approaching start of the first step. The switch may be located at a position away from the auxiliary contacts, as may be convenient, for convenience in design and construction of this embodiment of the timer.

A similar arrangement may be provided for any of the other steps in the process which may need prolongation of treating times as the exhaustion of the respective baths progresses.

Hand 41 is shown in FIGS. 1 and 2 as being fixedly joined to the free end of rotating shaft 39 of the clockwork 38. In another preferred embodiment of the invention, hand 41 is connected to the shaft 39 over means known per se which permit release of the hand and its rotation, preferably in clockwise direction, independently of the rotation of the shaft. Means which arrest the hand in counter-clockwise direction such that the hand follows the clockwise rotation of the shaft against the resistance of the counter-contact 42 when it engages with contacts 43 without slipping but permitting its free rotation in clockwise direction are preferred. Suitable means are ratchet assemblies known per se and other devices well known in the art which may be used with advantage to achieve the unidirectional adjustability of the hand without interference with the regular operation of the timer. These means are employed with advantage in the hereinbefore described embodiments of the program timer of the invention as well as in those embodiments described hereinafter. As can be readily seen, these means permit the setting of the hand to or close to the desired starting position independently of the respective position of shaft 39 of the clockwork.

Another embodiment of the program timer of the invention already mentioned hereinbefore, is characterized in that it is adapted to directly control automatic forwarding means capable of lifting the photographic material from the treating vessel in which they are threated, forwarding them to the next vessel and inserting the photographic material into the next vessel etc. exactly timed and in accordance with the time schedule programmed on the program timer. Suitable automatic forwarding means have been described e.g. in my copending application Ser. No. 342,029 in combination with a multi-vessel bath arrangement. These forwarding means may be actuated by a motor and/or solenoid, operating directly on the automatic forwardly mechanism or indirectly e.g. through the use of a pump and cylinders employing the hydrodynamic principle.

The modified program, timer, suitable for the automatic operation, corresponds in its basic constructional and operational features substantially to those described hereinbefore or to the modifications thereof described hereinafter in which however the socket and bulb, and the auxiliary sonic signal source may be deleted and a relay or a combination of relays substituted which upon closing of the primary circuit in the program timer actuate a motor and/or a solenoid or pump causing it to lift the photographic material out of the vessel in which it is contained and forwarding it into a position directly above the next vessel. When the carrier means containing the counter-contact means have traveled sufficiently to break the contact between or disengage the contact and counter-contact means, the correlated relay causes deactivation of the motor and/or solenoid and causes the forwarding means with the photographic material suspended thereon to lower the photographic material into the vessel directly underneath it. The primary circuit of the program timer is closed again by the engagement of the next contact means with the counter-contact means, the forwarding mechanism is energized in the manner as described hereinbefore and the photographic material is lifted from its treating vessel and so forth so that the photographic material is passed, in accordance with the exact time schedule programmed on the timer, through all the treating baths until it reaches the last bath from where it is either removed or automatically moved on to a drying rack, associated with the multivessel apparatus.

As is readily apparent, in this fully automatic operation including also suitable automatic agitating means, the operator need, after starting of the timer, merely place the photographic material contained in a suitable holder or carrier into the first treating vessel from where it travels through the various steps at the exact time schedule prescribed for the material without requiring his further attention. The time of engagement or the contact time between the contact and the counter-contact means may also be utilized in this embodiment of the timer to control the holding time between the treating baths, thus providing an exactly timed drainage time which is, as is readily known, of considerable significance in some of the exacting color processes for the obtention of accurate, reproducible results.

The operation may be further streamlined by the provision of a storage rack ahead of the first treating vessel from where the forwarding mechanism takes one or a predetermined number of holders stored on the rack at the proper time to start a new cycle, passing them without further attention of the operator through the process depositing them after completion of the multistep treatment on the drying rack.

The tongue and contact arrangement described hereinbefore in the program timer of the invention as the means for closing the primary circuit controlling the visual or audible indicator means or the automatic forwarding means respectively may be replaced by any of the many known means for establishing temporarily an electric contact so as to close for a predetermined time the primary electric circuit in the program timer and opening it at the end of this time period. One may also employ suitable means which keep the circuit closed for the time periods corresponding to the treatment in each step, opening only for the indication of the drainage time and/or forwarding so that in the embodiment employing visual indicator means the light will be on during the treatment and the photographic material is removed from the vessel when the light extinguishes and it is inserted into the next vessel when the light reappears. This expedient may be employed with particular advantage in the fully automatic relay-controlled operation where the opening of the primary circuit causes the operation of the motor and/or solenoid and the closing of the relay circuit inactivates the motor and/or solenoid.

Extremely high accuracy and freedom from error coupled with greater convenience in changing the timer over to the timing pattern fitting another photographic material is achieved with another embodiment of the timer of the present invention, in which the programmed contacts ring itself, with all the contact fixedly and permanently inserted, is made removable and exchangeable. The ring may be fastened to the face plate by the use of screws or by any of the known fastening means adapted for this purpose. For the highest convenience, the ring describes an incomplete circle leaving a sector open at a convenient place which facilitates slipping the ring over the hand 41. The program timer is provided with at least one of the exchangeable contact rings and the operator may purchase any desired other ring programmed to the time schedule required for the treatment of any other material or any other process he wishes to use.

An embodiment of the exchangeable contact ring is shown in FIG. 4. Ring 100 has an open section 101 and contacts 102 are set around the ring in accordance with the programmed process. Holes 104 in ears 103 are matched with holes in the face of the timer, at least one of which is provided with a metal sleeve (not shown) which sleeve is conductively connected to one terminal of the signal source. When the contact ring is fastened with screws to the face plate, the contact ring is thus conductively connected to one terminal of the signal source e.g. to socket 45 in FIG. 9, permitting upon rotation of the hand and tongue arrangement the closing and opening of the circuit as described hereinbefore. Mounting the contact ring in a circular recess contained in the surface of the face and adapted to receive the contact ring makes its positioning even more accurate.

The exchangeable open contact ring just described may also be used with advantage in combination with the switch and auxiliary contacts fixedly attached to the face plate as described hereinbefore in FIG. 3 of the drawings. In this case the ring will be designed to have a correspondingly larger open sector leaving free the area containing the auxiliary contacts. The exchangeable open contact may also be used in combination with an exchangeable contact ring of similar construction but of smaller diameter, corresponding in function to contact ring 49 in FIGS. 1 and 2 for the control of the auxiliary acoustical signal as described hereinbefore. If desired the two types of contact ring may be combined to form a unit by mounting them on a disc of an insulator, which in turn may be mounted on the face of the timer.

Instead of making the contact ring or rings exchangeable the face plate itself, with the contact rings permanently mounted thereon, may be adapted to be exchangeable. This principle will be described hereinafter in connection with another even more versatile embodiment of the program timer of the invention.

In the various embodiments and modifications of the program timer described hereinbefore all the contact means are conductively connected to one single contact ring or to each other with the exception of the auxiliary contacts illustrated in FIG. 3. As a result thereof all contacts of one series actuate or energize one common signal source.

In a more versatile and more advantageous embodiment of the program timer to be described hereinafter each contact is set in the dial face of the timer in an insulator so that none of the contacts is conductively connected to any of the other contacts. This embodiment of the timer is used in combination with a multiplicity or a series of signal sources, preferably socket and bulb arrangements of the kind described hereinbefore. Each signal source is coordinated to one step of the multistep photographic treating process. Each contact is conductively connected by wires or other conductor means to one terminal of the coordinated signal source. The second terminal of each of these signal sources is conductively connected to the plus pole of the battery, if such is used or to the free pole of any other source of electrical current used for the actuation of the signal source.

The total number of signal sources or lamps respectively equals the number of separate individual treating steps and preferably equals the full number of steps to be controlled in one complete sequence of the multistep photographic process by the program timer. Each signal source or light source respectively is advantageously located at or close to the vessel in which the treating step controlled by it is carried out. If electric bulbs are used as the signal source, each bulb is advantageously contained in a housing which, by the use of the proper safelight filters permits the passage of only such light which does not adversely effect the photographic material treated in the process under the respective operating conditions. Since each contact is advantageously set up to control and signal the end of the coordinated treating step, its coordinated signal source is preferably placed at or close to the vessel in which this treating step is carried out. The first signal source, which is controlled by the number one contact in or at the 12 o'clock position on the dial face of the timer, is either placed at or on the program timer itself or into another strategic location where confusion with the remaining signal sources is impossible, such as on the extreme left, when the processing is to be carried out in a left-to-right direction.

In the operation of this embodiment of the program timer using as the signal sources a multiplicity of light bulbs coordinated to the treating baths as described hereinbefore, the operator inserts the material to be treated into the first treating vessel when the first bulb, controlling the begin of the first process step, extinguishes. Thereafter, he removes the material from this treating vessel when the bulb, located at or near this vessel lights up, holds for drainage as long as the bulb is lighted and inserts the photographic material into the second treating vessel, when the light extinguishes, removes it from this vessel when the bulb coordinated to this second vessel lights up, drains and forwards it to the next vessel upon the appearance of the next light signal and so forth until the material has passed through all the treating vessels having thus been subjected to all the treating steps for the exact time periods programmed on the timer.

Instead of permanently connecting the series of signal sources to the program timer a plug and socket arrangement is used with advantage which has one separate, independent pair of contact lugs each for each light source or contact pin or contact means, respectively, permitting connection or disconnection of the signal source with or from the program timer as may be needed or desired. Only one additional pair of contact lugs need be provided for the connection of the second pole of the battery or other source so as to provide a closed primary circuit upon contact of the traveling counter-contact with any of the contact means contained on the face of the program timer. The female part of the plug and socket arrangement is provided advantageously in the program timer itself e.g. in the top section or at one of the sides of the housing.

Figure 6:
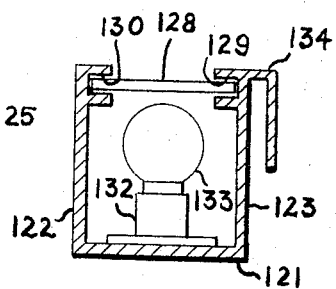
FIG. 6 is a vertical cross-sectional view of the light bar taken along line 6—6 of FIG. 5.

If the multistep treatment is carried out in a compact tray or vessel arrangement in which the treating vessels are placed in sequence and in close proximity, such as described e.g. in my Patent No. 3,236,649, one may employ with particular advantage a light bar such as that depicted in FIGS. 5 and 6 of the accompanying drawings or any equivalents or modifications thereof.

FIG. 5 is a schematic representation of the light bar and FIG. 6 is a sectional elevational view taken along line 6—6. Light bar 120 comprises a long trough-like housing consisting of bottom 121, sides 122 and 123 and ends 124 and 125. The trough-like body, which is open at the top, is subdivided into a multiplicity of chambers 131 by separatory walls 126. Each chamber 131 contains one socket 132 and bulb 133 mounted on the bottom. The length of each of chambers 131 in the direction of the length axis of the trough corresponds to the spacing of the treating vessels so that, upon coordination of the light bar with a series of treating vessels, each lamp is located opposite the center of one of the treating vessels. If the light bar is used e.g. in combination with the upright vessel-bath arrangement described in my application Ser. No. 350,612, filed Mar. 9, 1964, each bulb is located approximately opposite the vertical center line of each of the narrow sides of the upright vessels when the light bar is placed with its long side coinciding with and parallel to one of the long sides of the water bath containing the upright vessels in parallel arrangement with their narrow vertical sides parallel to the long sides of the water bath. This arrangement assures exact juxtaposition and thus coordination of the individual light sources to each treating vessel.

An exception from this basic rule is made with the bulb, which is controlled by the number one contact means controlling or indicating the begin of the first treatment step of the series. It is either placed independent and thus not part of the light bar. Or, alternatively, it is added to the left in the case of a left-to-right direction of forwarding of the photographic material through the individual baths or it is placed to the right, in the case of the opposite forwarding direction, such that it does not face a treating vessel. The light bar shown in FIGS. 5 and 6 is intended to be used with a separate signal source for the indication of the begin of the first step, which signal source is located on and integral part of the timer to be used with the light bar.

Placing the light bar at a position close to the upper edge of the treating vessels i.e. at or close to the upper edge of the water bath will facilitate the timing and processing. Brackets 134, joined to the top edge of side wall 123 of the light bar, permit convenient placing of the light bar alongside the water bath by simply hooking the brackets over the upper edge of the respective side wall of the water bath. The brackets are only slightly narrower than the width of each of the compartments of the bath. Placing the left bracket with its free end into the compartment of the bath containing a treating vessel situated on the far left of the bath (viewed from the side onto which the light bar is to be placed) will automatically insure full alignment of the light bar with all the treating vessels contained in the bath. The operator, upon seeing a bulb light up simply takes the holder or carrier contained in the vessel opposite the lighted bulb and removes it from the vessel. The expedient of close coordination of signal source and vessel is particularly beneficial in a compact apparatus using narrow treating vessels or say one half to one or two inches width being separated from each other, center to center by from one to two or three inches, respectively. The close proximity of light signal and the carrier, containing the photographic material to be forwarded at the appearance of the signal, assures that no mistake or error occurs in an operation where more than one treating vessel of the series is simultaneously occupied by a holder or carrier with one or more sheets of photographic material contained thereon as will be described hereinafter.

To avoid the exposure of the light-sensitive photographic material handled in the process to damaging light, the light bar is closed all around at the bottom and at the sides and made light tight. Its open top is closed off by a strip 128 of transparent or opaque safe-light material of a color permitting only the passage of light of a wave length which is substantially safe to the material to be processed. The same safe-light material, which is recommended by the manufacturer for the lighting of the darkroom for the particular photographic material to be processed, may be used with advantage such as dyed glass, dyed gelatine or dyed plastic foil. The latter two materials may be placed between glass as is customarily done. The strip 128 is held slideably in grooves 129 and 130 provided at each of the upper inside portions of sides 122 and 123 of the trough. The strip 128 may be easily removed by sliding it to one side in the direction of the length axis of the trough so as to permit convenient replacement of the bulbs contained in the individual chambers and to permit substitution of the most suitable safe-light strip for the material to be processed. To facilitate this operation, end wall 125 extends to a level just below the underside of strip 128. The separatory walls 126 forming the individual chambers extend close to the plane defined by the underside of strip 128 so as to safely prevent passage of light from one chamber to the next. Even better definition and separation of the lighted areas superimposed on each of the chambers or formed by the transparent top side of each chamber, respectively, can be achieved by the provision, on the open top of the light bar of framing strips of light impermeable material running perpendicularly between and connecting the long walls of the trough at all positions directly above each of the separatory walls 126 and the ends 124 and 125 leaving a slot between the upper edge of each of the separatory walls and the lower edge of each of the framing strips large enough to permit the transparent safe-light strip to be inserted. Each of the sockets 132 is conductively connected to the coordinated contact means on the program timer and to the source of electricity as described hereinbefore. The operation of the program timer in conjunction with the light bar corresponds to that described hereinbefore with respect to the operation using a series of independently controllable light bulbs.

Another embodiment of the light bar has in addition an intermediary horizontal bottom (not shown), mounted slightly above bottom 121 in parallel alignment serving as the support for the sockets. The sockets are mounted on top of the intermediary bottom, one each in each chamber. The channel formed by the bottom of the light bar, the just mentioned intermediary bottom and the lower sections of the sides and ends of the light bar may be used conveniently for the placing of the wiring of the light bar. The top of the light bar containing the transparent strip 128 or individual transparent sections opposite each bulb may also be designed as a lid, which is simply placed on top of the open body of the light bar. If, in this embodiment of the light bar, the separate sections are joined at their lower ends only to said intermediary bottom, the whole chamber assembly may be readily inserted or removed from the light bar for easy servicing.

The light bar may be constructed in any other desired manner. Instead of sliding the transparent safe-light strip removably into the light bar as described hereinbefore the light bar may be designed such that the safe-light strip is simply placed on top of the open side of the trough-like body of the light bar and a separate cover placed on top of the trough so as to hold the safe-light in place and to prevent the escape of white light. The cover has advantageously a multiplicity of separate, defined openings, one each opposite each bulb or chamber. The openings may have any desired shape as described hereinbefore. They may be round, rectangular, square or polygonal as the case may be. The edges of the cover are advantageously provided with a rim overlapping and surrounding the upper edge of the trough when the cover is inserted so as to prevent any white light from escaping into the room. In the alternative, the cover may be sunk into the trough, supported on a rim contained all around inside the trough which rim serves also as the seal against the escape of white light. The cover may also be fastened to the trough-like body of the light bar by a hinge.

Depending on the preferences of the operator and on the particular circumstances in the darkroom, the light bar may be operated with the transparent side pointing up or to the side away from the treating vessels with the transparent side of the light bar in vertical orientation. Alternatively, both the top and the exposed long side wall of the light bar are made transparent or are provided with transparent safe-light covered perforations in each of the chambers, so as to permit observation from either side or top as may be desired by the operator. Instead of attaching the light bar to the water bath by help of the clamps 134, other suitable holding means may be provided on the bath or on the light bar, which permit proper positioning of the light bar so that each of its chambers is properly lined up with the vessel in which the treatment is carried out which it controls and times as described hereinbefore. Most advantageous is the provision of means which assure always and automatically proper juxtaposition of each light chamber or cell with the coordinated vessel such as a stop at one or better at each end of the water bath between which the light bar slips in when it is inserted. Though it is possible to design the light bar as a fixed or permanent component of the water bath by building it into one side or joining it to one top edge of the water bath, it is preferred to construct it as a separate unit. This permits placing of the light bar at either side of the bath (requiring only reversal of the male multicontact plug in the female plug contained in the process timer). It permits also cleaning or emptying of the water bath, without the danger of water entering the light bar.

For the convenience of the less experienced operator some additional modifications of the process and apparatus of the present invention may be made. In order to avoid or prevent errors in the sequence of applying the treatment solutions in the individual steps, particularly in the multistep color developing processes, the vessels or troughs and the storage bottles may be color-coded. Selecting one and the same color for the labels, caps etc. of packages or bottles containing the ingredients for that particular solution, for the storage bottles containing the prepared treatment solutions and for the vessel or trough to be used for the particular step and its section of the water bath where it is to be placed, makes it virtually impossible that mistakes in the proper sequence of the steps of the particular process are made.

For the greatest ease and convenience of operation the light bar may also be provided with the color code and/or geometrical design arrangement. The code appears advantageously on a long strip of material which by the provision of suitable holding means may be simply slipped into the light bar. A different strip containing the code is used for each different process. Transversal sections of the different code designations appear on the strip, each section having a maximum width corresponding to that of each chamber in the light bar. The operator attaches first the light bar, with the code strip inserted, to the water bath. Thereafter he inserts the treating vessels into the water bath, matching the code of each vessel with that appearing opposite its location in the code strip, using coded storage bottles for the treating solutions. The operator need only match the code of the treating vessels with those appearing on the code strip inserted in the light bar. This assures not only that a given vessel is used every time for the same treating solution but makes any error in the sequence of the treating solutions virtually impossible. This is very important in photographic processes having a large number of steps such as some of the modern color developing processes. Any mistake in the order could produce loss of a whole batch of material produced in one session because an error in the sequence of treating solutions might not be discovered before one or more batches of material have been treated and inspected closely in white light.

In another embodiment of the light bar each bulb projects from the main body of the light bar and is completely surrounded by a separate dome-shaped safe-light. Alternatively, the bulbs may be recessed in individual cylindrical or rectangular cells, each of which is covered by a safe-light. Said cylindrical or rectangular cells are advantageously removably mounted on a common support, permitting replacement of the bulbs after removal of the cylindrical or rectangular cell. Which of these or any other of the many modifications or possible embodiments of the light bar is employed, depends primarily on the size and relative arrangement of the treating vessels.

When the light bar becomes too big for convenient handling because the treating vessels or trays are too large or placed too far apart from each other, the signal sources may be employed individually and attached to or placed adjacent to each of the treating vessels or trays which is controlled by this light source.

The various embodiments of the program timer described hereinbefore are adapted to time and control one single sequence of treating steps at a time. The next batch of materials can be treated and timed only after completion of the treatment of the preceding batch. The rate of production which can be achieved in this manner is rather limited particularly where the complete process requires a total treatment time of 40 minutes to one hour or more, as is the case with many of the modern color processes.

It is one of the particular advantages of the program timer of the present invention that it can be readily adapted, by the provision of simple means, to time accurately and reliably any desired number of simultaneous, phased treating sequences, of the same process, but started in sequential order so as to overlap with at least part of the treating steps. This becomes of particular interest, when the operator wishes to carry through a given set of treating vessels or trays the maximum number sheets of photographic treating material, thus minimizing idle time of each vessel or tray to the highest possible degree and obtaining the highest possible production rate from an apparatus of given size and capacity. In the practical application of this principle the operator starts a new treatment schedule before the preceding one is completed, using the same timer for the timing of both and if desired of additional batches, each carried out independently of the other and following its own separate treating schedule.

As stated, the simultaneous treatments are carried out in the same series or set of vessels and treating solutions. The only limitation as to the shortest time lapse for starting the next treatment sequence is the duration of the longest treatment step in the process. If the longest step takes for instance 10 minutes, one may theoretically start a new treatment every 10 minutes. With a duration of the total procedure of for instance 50 minutes, one may thus process up to five batches of photographic material simultaneously and independently, and correctly timed with the use of only one timer of the type described hereinafter.

The preferred embodiment of this more versatile program timer comprises a housing with a clockwork and a dial or face containing individually wired contact means or contact pins, as described hereinbefore, in combination with a light bar or a set of individual, separate signal sources, one each of which is coordinated to each of the treating vessels. The timer comprises preferably also the assemblage for generating the acoustical prewarning signal, described hereinbefore. Instead of having one single hand and counter-contact means, the multisequence program timer has mounted on the shaft of the clockwork in the same plane and radially spaced from each other a multiplicity of hand contact spring arrangements. The maximum number of hands which can be accommodated in one program timer equals the quotient of the total time of one full rotation of the clockwork shaft in minutes, divided by the duration in minutes of the longest treatment step in the process to be timed and rounded to the next lower integer. Any number of hand counter-contact arrangements which is lower than this maximum number, but higher than one, may likewise be used in this embodiment of the program timer, depending on the desired rate of throughput of the photographic materials.

Figure 8:
FIG. 7 is a front elevational view of a multihand arrangement useful with the timer of the invention and FIG. 8 is a detail elevational view of an embodiment of the adjustable counter-contact provided at the free end of each of the hands in FIG. 7.
Figure 7:
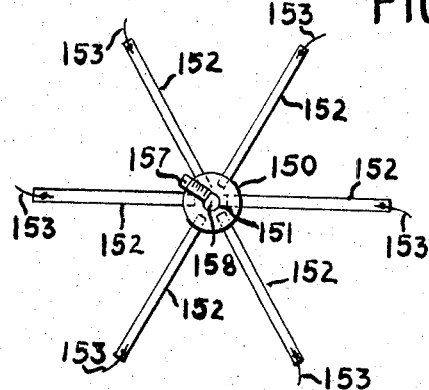

An embodiment of the multihand counter contact tongue arrangement, containing six hands and counter-contacts, is depicted in FIGS. 7 and 8 of the accompanying drawings. Disc 150 made of an electrical conductor, has central bore 151 dimensioned and shaped to fit snugly over the free end of the shaft 158 of the clockwork of the program timer (not shown) with which it is to be used. Six hands 152 are joined to and radially extending from the disc 150, the angle between neighboring hands being 60°. The free end of each hand carries counter-contacts 153, removably and adjustably fastened to the hand by screws 154 through long holes 155, provided at the free end of each hand. Opening the screw permits adjustment of the counter-contacts 153 in radial direction along the axis of each hand 152. Prismatic guide 156, fitting movably into long hole 155, is fixedly joined to contact spring 153 and prevents angular distortion or deflection of counter-contact 153 from its fixed direction.

The multihand arrangement just described may be used in the same maner as described hereinbefore for the single hand timer. The single hand in any of the various embodiments of the program timer described hereinbefore, may simply be removed and replaced by inserting and arresting e.g. the six hand arrangement on the free end of the shaft of the clockwork by set screw 157 or similar means, contained in a radial threaded bore. The set screw is tightened to engage in the flattened portion of the shaft 158 of the clockwork.

If one full turn of the shaft 158 takes one hour, each hand starts a new treating sequence with a delay time of 10 minutes from the preceding one and each hand will generate a full succession of signals exactly timed in accordance with the requirements of the process for which the timer has been programmed.

As is apparent, the hands work independently of each other and with the use of the light bar or multiple light bulbs coordinated to the treating vessels, the operator removes the material from each of the vessels or trays when the coordinated bulb lights up, and inserts it into the next vessel or tray when the bulb extinguishes. The acoustical prewarning signal will function in the same manner as described hereinbefore, if a second independent counter-contact means, cooperating with the set of contacts controlling the acoustical signal, is provided on each of the hands. The signal will be generated at the predetermined time interval prior to the lighting up of the bulb, indicating to the operator that a batch of materials must be readied for forwarding to the next vessel or tray.

The unexpected advantages of the multihand system become apparent, if one considers the large number of prints which may be produced by one operator in one series of treating vessels without the slightest loss of accuracy or reproducibility. It is practically impossible, that an operator times with the use of a conventional darkroom timer the simultaneous multistep treatment of a multiplicity of batches of photographic material in phasing and in the same series of treating vessels in overlapping fashion. Even the use of several conventional timers will not avoid confusion, error and mistake in the treatment of each of the batches in each of the steps, each batch being at a different stage of treatment and each step requiring a different treating time. All this, with up to 50 or more forwarding steps per hour to be carried out, becomes a well controlled, orderly operation with the use of the multistep, multibatch process timer of the present invention.

Employing the multiexposure easel of my Patent No. 3,280,694 and producing 3½ x 3 inch size prints on an 8 x 10 sheet positive printing color paper and employing a carrier means, containing a batch of six sheets of paper, an operator may process in an eight hours work day by the most complex color printing process up to approximately 1500 to 1600 3½ x 3 inch prints with the use of the timer of the present invention. Using a basic sheet of print material of double the size, this number is doubled to over 3000 per day. Such large numbers of prints could herebefore be produced by one operator only in the expensive continuous developing machines. The program timer of the present invention thus opens large volume printing to the individual operator who can not afford the investment required for the continuous machines. Alternatively, if the operator desires to process only a smaller number of prints, he can significantly reduce the actual time required for the development and treatment of a given number of color prints, as compared with the time required in the conventional methods, permitting the processing of one batch of material at a time. Thus the program timer of the present invention permits the realization of great savings in time and in actual cost of development without sacrifice of accuracy and reproducibility.

The single sequence as well as the multisequence program timer just described, may be readily adapted to be operated by a blind worker. Substituting for each bulb in the light bar or for each individual coordinated light signal a characteristic acoustical signal the operator can follow the signals by ear. This arrangement is advantageously supplemented by the provision of a solenoid or similar device provided at each vessel and controlled by the primary or, if desired by a secondary circuit, and thus by the same set of contact means on the face of the program timer. The solenoid actuates a lever so that the operator upon hearing an acoustical signal, feels out by hand the vessel from which a batch of the treated material is to be forwarded or removed. When in the rest position or deactivated, the lever is advantageously recessed or retracted in the housing or base, in which it is contained. When the solenoid is activated by the closing of the primary circuit, the lever pops out and can be readily discovered by feel. The operator then need only lift the holder or carrier, contained in juxtaposition with the actuated lever from the vessel to forward it to the next, when the acoustical signal stops. This system of acoustical or combined acoustical and mechanical signals is also used with great advantage by any other operator, if development in complete darkness is desired.

The just described embodiment of the multisequence timer, containing a multiplicity of counter-contact means, in which all the counter-contact means are operative and remain operative at all times, is most advantageously used, if the operator wishes to utilize the full number of signal cycles or the majority of the signal cycles, generated by the traveling hands. If only individual selected cycles are to be utilized at the discretion of the operator e.g. every second or third or any one or more of the cycles, one will prefer another embodiment of the multisequence timer, which permits the activation or deactivation of each of the signal cycles by mechanically or electrically connecting or disconnecting the respective counter-contact means, prior to the starting of the respective cycle.

Figures 9, 10:
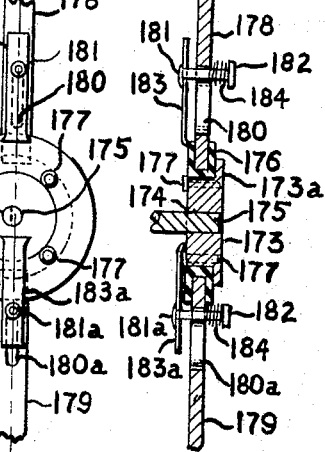
FIG. 9 depicts a fragmentary rear elevation of a two hand arrangement.
FIG. 10 is a fragmentary vertical section of the two hand arrangement taken along line 10—10 in FIG. 9.

An example of an embodiment of the multihand arrangement, having two hands in 180° radial spacing and using electrical switching means for the activation or deactivation of each of the counter-contact means, is shown in FIGS. 9 and 10 of the accompanying drawings. A composite disc 172 comprises central disc 173, made from an electron conducting material or metal, which is surrounded by outer ring 176 made from an electrical insulator. Disc 173 has central bore 174, dimensioned and shaped to fit snugly over shaft 175 of a clockwork (not shown), forming part of a program timer as shown and described hereinbefore. Outer ring 176 is coaxially joined to the periphery of inner disc 173. The rear faces of both disc 173 and ring 176 are in one plane, so as to form a continuous surface all over the rear of composite disc 172. The front of disc 173 is flanged, flange 173a extending partly over the front of ring 176 to give it support and permitting the fastening of the ring 176 to the flanged disc 173 by screws 177. Hands 178 and 179 are fixedly inserted by their bases in recesses in ring 176, so as to be insulated from disc 173 and shaft 175. On each hand, close to their bases and in proximity to the outer circumference of ring 176 are provided long holes 180 and 180a. Pins 181 and 181a secured on the front by nuts 182 are slideably projecting through long holes 180 and 180a, respectively, and fixedly joined at their head portion to slide contacts 183 and 183a, respectively. The pins 181 carry, between nuts 182 and the front of the hands coil springs 184, which hold spring contacts 213 tightly against the front of composite disc 172. The contact arrangement on hand 178 is shown moved radially outwards, pin 181 being located at the outermost end of long hole 180. As can be readily seen, the free end of slide contact 183 rests on ring 176 of the electrical insulator. There is thus no conductive connection between hand 178 and disc 173 or shaft 175, respectively. Hand 178 is thus not active and not capable of actuating the signal sources as it rotates around the face of the program timer.

The contact arrangement on hand 179 is shown moved radially inwards, pin 181a being located at the innermost end of long hole 180a. The free end of contact 183a rests on the face of disc 173 which is made of an electron-conducting material and which is in conductive connection with shaft 175. Hand 179 is thus conductively connected to the shaft 175 and accordingly to one pole of the source of the electric current actuating the signal source. The counter-contact means contained on this hand thus is capable of making and breaking the primary electrical circuit, as the hand travels around the face of the program timer and engages or disengages with the contact means, spaced around the face of the program timer, as described hereinbefore. By sliding contact 183, with light forward pressure on the pin to lift the contact from the face of disc 172, radially inwards toward the center or outwards from the center, each hand can be conductively connected or disconnected from the current in the shaft, and thus activated or deactivated as is needed. This applies in analogical manner, if more than two hands and coordinated counter-contact means are provided. In this manner the multihand arrangement may be used with a single activated counter-contact means, providing the signals for only one processing sequence or it may be used with any number of the counter-contact means activated up to the maximum providing the signals for a corresponding number of simultaneous phased and overlapping processing sequences.

Instead of using the particular arrangement just shown and described one may employ any other switching means, capable of activating or inactivating the counter-contact means by establishing or breaking electrical contact between the hand and the shaft 175. Such means are well known in the art and may be readily adapted for the purposes of the present invention.

The switching means may, alternatively, be mounted in the housing of the timer, each switch being conductively connected to a contact ring on the dial face with which a brush sliding over the contact ring establishes connection between the hand and the contact ring and over the switch with one pole of the source of electricity.

In this case the hands are set in insulated fashion from each other and from the shaft of the clockwork. An embodiment of the multihand timer incorporating this principle is represented schematically in FIG. 11 of the accompanying drawings.

Dial 201, made of an electrical insulator, has an outer ring 202 of an electrical insulator with metal contacts 203, 204, 205, 206, 207 and 208, arranged in a circle and spaced from each other to provide the program of a five step photographic treating process. The contacts are conductively connected by wires 209, to one terminal each of bulbs 210, 211, 212, 213, 214 and 215 in this order. The bulbs are contained in light bar 216, having a total of six individual chambers, each containing one of the bulbs 210–215. The second terminal of each of bulbs 210–215 is conductively connected to the plus pole of battery 217 by wires 209a. Contact rings 218, 219 and 220 of successively diminishing diameter are concentrically mounted on the dial face, each of the rings 218–220 being conductively connected by wires 223 to one of the switches 236, 237 and 238, which in turn are conductively connected to the minus pole of battery 217 by wire 222, Disc 224, made of an electrical insulator, is concentrically mounted on rotatable shaft 225 of a clockwork (not shown). Hands 226, 227 and 228 are set in disc 224 at a spacing to each other of 120°, such that they are electrically insulated from each other and from shaft 225. Hand 226 has on its underside contact brush 229 directly above and in contact with contact ring 220. A similar contact brush 230 is contained on hand 227 in electrical contact with contact ring 219 and a third contact brush is similarly mounted on hand 228 above and in electrical contact with contact ring 218. At the free ends of hands 226, 227 and 228 are provided counter-contacts 232, 233 and 234, each conductively connected to the respective hand and set at right angles to the hand in a circle, having a diameter equal to the diameter of the circle, in which contacts 203–208 are set in ring 201, so that counter-contacts 232–234 slide on ring 201 and over contacts 203–208 as shaft 225 and the trihand arrangement rotate.

Switches 237 and 238 are shown opened, while switch 236 is closed. In this manner, hand 228 and counter-contact 233 are conductively connected, over contact brush 231 and contact ring 218 to the minus pole of battery 217. When upon travel of the hand 228 and counter-contact 234 around the dial, the counter-contact 234 touches and slides over one of contacts 203–208, the respective primary circuit will be closed and the bulb controlled by this circuit will light up. In the illustration, the next contact to be engaged by counter-contact 234 on its travel around the dial is contact 208. When contact is thus established, bulb 215 will light up, indicating that the treatment in the last step of the five step process is terminated. Contact 203 is the number one contact, signaling the beginning of the first step, as explained hereinbefore.

Counter-contacts 232 on hand 226, and 233 on hand 227 are inactivated, because the coordinated switches are opened. Closing of the respective switches will energize the respective counter-contacts, which upon engaging with any of the contacts 203–208 will close a primary circuit with the coordinated bulb in the light bar lighting up. As is readily apparent, the device represented in FIG. 11 permits the simultaneous phased timing of three successive batches of processing. When the operator is ready to start a batch of material through the treatment schedule, he will energize the hand, which will next engage the number one contact (contact 203), by closing the coordinated switch (switch 221) and deenergize, if necessary, the others by opening the respective switches.

As can be readily seen there are six primary circuits, their number being equal to the number of independent signal sources or to the maximum number of treating steps, for which the timer is programmed. The number one contact may be omitted if it is desired to start the first step by setting the timer to the zero time and starting the timer simultaneously with the insertion of the photographic material in the first bath. In this case, the number of primary circuits is equal to the number of treating steps for which the timer is programmed. However, as is readily apparent, the number one contact means does greatly facilitate the timing of a multiplicity of processing series, simultaneously and phased, so that the omission of the number one contact means is not recommended in the multisequence timer. The single sequence timer, on the other hand, may be satisfactorily used with the number one contact means omitted.

The single hand and the multihand embodiments of the program timer described hereinbefore, may be further modified by mounting the counter-contact means, instead on individual hands, on a rotatable disc of an electrically insulating material. The disc is mounted on the shaft of the clockwork in a manner, similar to that described for the single and multihand arrangements. The rotatable disc has a radius approximating that of the hands described hereinbefore, with the counter-contact means mounted at or near the outer edge of the disc in a circle and in the required distance from the center and in a spacing from each other corresponding to the desired spacing of the beginning of the successive treatment schedules. The counter-contact means for the control of the acoustical auxiliary signal are mounted on the inside of the disc, facing the dial face of the program timer, in a circle of a radius adjusted such, that they alternatingly engage and disengage on their travel around the dial the coordinated contact means, controlling the auxiliary sonic signal source. Each of the counter-contact means may be permanently and conductively connected through the shaft with one of the poles of the source of the electrical current as described hereinbefore, or alternatively, switches may be provided, permitting the closing or breaking of the conductive connection between each of the counter-contact means and the source of electricity as described hereinbefore, permitting the selection of any desired number and sequence of full process cycle timings.

Likewise, the contact ring-brush arrangement may be readily adapted to be used in combination with the counter-contact disc by setting the brush for each cycle at a proportioned, decreasing distance from the center of the disc, providing for each brush a correlated coating contact ring on the dial face and conductively connecting each brush with one of the counter-contact means and each contact ring with one pole of a separate switch, which switches are in turn conductively connected to the source of electric current, as described hereinbefore. If the switching means are mounted on the disc, any desired type of switching means may be used, provided it is not too bulky and easy to operate so as not to interfere with the accuracy of the clockwork. The disc is advantageously mounted on the shaft by help of a ratchet assemblage, as described hereinbefore, which permits rotational adjustment of the disc in the direction of its rotation, but securely arrests the disc so as to safely prevent rotation or slipping of the disc counter to its rotational direction relative to the shaft. As explained hereinbefore, this expedient permits setting of the program timer to any desired position and particularly to the zero position or close to the position starting the first step of the first process cycle.

The convenience of the just described multisequence timing may also be achieved with the use of a single counter-contact means, contained on a single rotatable hand or disc, which in this case need not be insulated from the shaft of the clockwork. In this embodiment of the timer more than one set of contact means, controlling the steps of the multistep photographic treating process are provided on the dial face. If it is desired to time, for instance, two phased process sequences simultaneously, each contact means controlling each of the steps of the process is doubled, i.e. a second complete series or set of contact means, controlling the second sequence, is provided on the dial or face of the timer. Each contact means of the second set has been shifted around on the dial clockwise (if the clockwork turns clockwise) by an angle corresponding to the time lapse between the starting of the new process sequence, i.e. by an angle, corresponding to the angle between the hands in the multihand arrangement, providing the same time lapse. The angle of shift may also be calculated from the above given equation.

Thus, any desired number of sets of contact means required to carry through simultaneously and sequentially the corresponding number of batches of photographic material in phasing, as described hereinbefore with respect to the multihand arrangement, may be provided on one and the same dial. The only limitation is, as stated, the requirement that the time lapse for starting the next batch should not be shorter than the duration of the longest processing step occurring in the process for which the timer is designed, if the treatments are all to be carried out in a single set of treating vessels or trays. This limitation does naturally not apply, if more than one set of treating vessels or trays are to be used, or if one or more auxiliary vessels are provided for the steps of the longest duration.

To provide for simple design, all of the contact means on the dial or face, controlling one and the same identical step in the various successive treatments are advantageously wired together and are conductively connected as a unit with the coordinated signal source. Thus, all the contact means, controlling the first step, are conductively connected to each other to form a unit, likewise all contact means, controlling the second step and all contact means, controlling the third step of the multistep process and so forth, are conductively connected, e.g. by wires, to form a unit. Each unit of contact means is in turn connected to the signal source coordinated to the particular step or treating vessel, respectively. Furthermore, each series or unit of contact means, controlling any one of the complete sequences of treatment steps, i.e. the full treatment of any one batch in the process, may be switched in or out at the discretion of the operator by the provision of multiposition ganged switches, the number of switches being equal to the number of individual steps in the process and the number of positions in the switch, equalling the number of process sequences. If each contact means of one series is conductively connected to its correlated signal source over one of the switches making up the ganged switch unit, all contact means, controlling one full sequence of steps, are activated or inactivated by a single actuation of the means, connecting the multiplicity of switches forming one group or gang. The program timer of the invention may be made even more versatile by combining both concepts viz. the use of multiple sets of contact means on the dial face and of multiple counter-contact means in a multiple hand arrangement or on the rotatable disc.

In spite of their great versatility, most of the embodiments of the program timer described hereinbefore are programmed for only one photographic process, that is, they are designed and adapted to time or control only one single particular kind of treating process, having a fixed schedule of durations and sequence of treating steps. An exception is the embodiment of the timer, having provision for free adjustment of the contact means around the circumference of the contact circle as described hereinbefore. Another exception is the embodiment of the timer, which is provided with a large number of contact means, spaced and arranged independently of any particular program or timing schedule. The contact means are spaced by equal angles from each other, corresponding to a small fraction of the total time required for one full revolution of the counter-contact means. A spacing, corresponding to from ½ to 2 minutes was found to be most suitable. With a spacing of the contact means corresponding to one minute from one contact means to the next, a timer, having a total capacity of 60 minutes, is provided with a total of 60 contact means, set in an electrical insulator. Each of the contact means is conductively connected to one position of a 60 position sliding switch, having a multiplicity of sliding contacts on a common sliding bar, such that all sliding contacts of the switch are conductively connected to the common sliding bar. The number of sliding contacts corresponds to the highest number of steps in a succession of steps to be timed by the timer.

The said sliding bar is conductively connected to one terminal of the single signal source. Its second terminal is conductively connected to one pole of the source of electrical current, while the counter-contact means, contained on a movable carrier, e.g. on a hand, is conductively connected to the second pole of the source of electric current. By setting the first sliding contact over the position of the switch, corresponding to the termination of the first step of the process (e.g. the 12th contact means, counted from the zero or 12 o'clock contact means, if the first step has a duration of 12 minutes) the first contact means is activated. After setting in similar manner the second and following sliding contacts, one each for each step of the process, the process has been electrically programmed in this manner on the timer, which, with the given setting, provides the program for as many repeated runs as the operator may desire. If the operator wishes to practice a different process, he simply reprograms the timer to adjust the timing schedule to the new process.

This embodiment of the timer may be further modified to be suitable for the operation with a multiplicity of signal sources, e.g. with the light bar by setting the sliding switches on a sliding bar made from an electrical insulator and conductively connecting each sliding contact to the signal source coordinated to the step of the number, corresponding to the sliding contact and signal source, controlled by it. Provision for the operation of the auxiliary sonic signal and for the phased multiprocess operation (by the use of a multiplicity of counter-contact means as described hereinbefore) is readily possible. Any equivalent switching means, especially ganged rotary switches or similar devices, serving the desired purpose may likewise be used for the electric programming of this embodiment of the timer.

The just described timer including its modifications and variations falls within the scope of the present invention and is encompassed by the term "programmed." As can be readily seen, this timer is extremely versatile, capable of being programmed for any desired process, falling with its total duration within the time capacity of the timer and with its total number of steps within the number of sliding contacts provided in the timer.

Another embodiment of the program timer which will be described hereinafter in more detail, is equally versatile. This embodiment is adapted to control alternatingly any desired photographic treating process, having any desired sequence and number of steps of any desired duration for each step and for the total process, yet employing permanently programmed dial assemblages, containing the contact means preset in the pattern required for each of the processes to be timed with the advantages inherent in this construction. They do thus not require any tedious and time consuming shifting and adjusting of the contact means by the operator and they positively assure absolute reproducibility and exclude the possibility of inadvertent error in the programming.

The simplest embodiment of the program timer of this type has provided on its dial or face a multiplicity of full sets of contact means, one set each for each of the processes and photographic materials to be timed or controlled by the timer. Each of the sets of contact means is independent of the others and is composed of a number of contact means corresponding to the number of treatment steps, making up the process to be timed or controlled. The contact means within a set are spaced from each other by an angle, corresponding to the particular program as described hereinbefore, providing the exact treatment time required for each individual step of this particular process. The first series of contact means thus is made up by a number of contact means spaced relative to each other as required by process A, the second independent series is composed of a number of contact means with a relative spacing as required by process B and so forth, each series of contact means making up an independently programmed unit as described hereinbefore in connection with the single sequence or single process program timer.

All the contact means are set in a common circle and insulated from each other. The required wiring and connections between the contact means and other elements, making up the timer differ greatly and depend on whether a single signal source or multiple signal sources are employed and whether single sequence or overlapping multisequence treatments are desired to be timed.

If the timer operates with a single signal source, such as shown in FIGS. 1 and 2 of the drawings, all contact means, controlling one and the same process e.g. process A are wired together and conductively connected as a group over a single pole switch to one terminal of the signal source. All contacts of process B, are likewise wired together to form a group and each group is controlled by a single pole switch as described and so forth for process C, D, etc. The switches may be push button or toggle switches or the like, one for each process or they may be combined to form a multiposition rotary or sliding switch or the like, with one position for each process, permitting the operator to simply dial the desired process. All contact means, controlling the steps of one desired process or sequence of steps will thus, by closing the respective switch or by setting the rotary or sliding switch to the respective position, be activated, actuating the signal source upon engagement or disengagement of the cooperating counter-contact means with any one of the contact means making up the set. All the contact means which are not part of the selected process, are disconnected from the signal source and thus inactive and not interfering with the operation of the signal source in accordance with the time schedule programmed for the selected process. Instead of connecting the individual contact means to the signal source, they may be conductively connected over the respective switches directly to one pole of the power source. The traveling counter-contact is accordingly connected to one terminal of the signal source.

If the multiprocess timer is to be used in combination with a multiplicity of signal sources e.g. with the light bar described hereinbefore, all contact means controlling the first step in each of the programmed processes are conductively connected to the signal source correlated to the first treating vessel or tray. Likewise all contact means, controlling the second step are conductively connected to the signal source, correlated to the second treating vessel or tray in which the second step of each of the processes is to be carried out and so forth for each of the following series of contact means. Usually, some of the signal sources will be connected to less than the full number of contact means, the full number being equal to the number of different processes programmed on one and the same timer. Thus processes having, for instance, only five steps may be readily combined in one and the same timer with processes having 12 or 14 or more steps, as the case may be.

To permit selection of any one process for which this embodiment of the timer is programmed, switches are provided in the electrical connections between the signal sources and each of the contact means. Advantageously, the switches connected to the contact means, controlling one and the same process, are ganged and provided with the one common means for actuating all the switches in the group. Thus, in order to select one of the processes, the operator need only push one button or one lever, carrying the process designation.

It was found that some of the commercially available ganged multiposition rotary switches may be readily adapted for the purposes of this embodiment of the timer of the invention. The number of multiposition switches required, corresponds to the highest number of steps in any one of the programmer processes. The number of positions on each switch corresponds at least to the number of different processes programmed. All the switches are advantageously ganged i.e. they may be mounted on a common shaft in alignment so that all $a$-positions, $b$-positions, $c$-positions etc. of all switches are exactly lined up. By rotation of the shaft by one step all contact means controlling one of the programmed processes are connected to their respective signal sources. By the provision of a dial at the face of the switch, indicating the process designation, corresponding to each of the programmed processes, the operator simply dials the process he wishes to carry out. If some of the process sequences have less than the maximum number of steps, some of the positions in some of the switches will be unoccupied.

The just described embodiment of the program timer is, as can be readily seen, most versatile and may be designed to handle any desired number of different processes. If one provides instead of the single counter-contact arrangement one of the above described multi-counter-contact arrangements, the program timer will also time phase, successive treatments of several batches of materials to be treated simultaneously by one of the programmed processes without loss of the convenience of utilizing the timer at different times for different processes by simply dialing any one of the programmed processes.

The various embodiments of the just described multi-process timer may be operated, as stated, with one or a multiplicity of light signals. Alternatively, sonic or mechanical signals may be substituted as described hereinbefore. If desired, the preferred combination of light signals with a sonic prewarning signal, may be employed by providing a duplicate set of the contact means conductively connected to the sonic signal source and cooperating with its own counter-contact means, as described hereinbefore. This and any of the other arrangements and means for achieving the sonic prewarning described hereinbefore, may be readily adapted to be incorporated in the design of the multiprocess program timer of the present invention.

Figure 11:
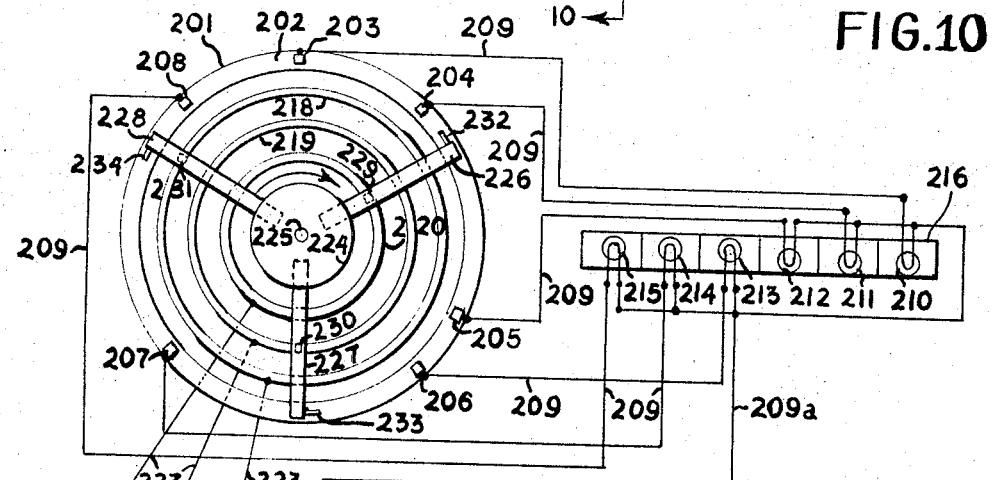
FIG. 11 is a diagrammatic view of a wiring diagram used in combination with a trihand arrangement.

Instead of setting the various series of contact means into one common circle or line, each series of contact means coordinated to one process or sequence of processing steps may be set in a separate circle, the circles being of decreasing diameter and set concentrically on the dial. A separate counter-contact means is coordinated to each of the series of contact means. Each counter-contact means may be activated or deactivated by suitable means, preferably by separate switches, as is shown in FIG. 11 of the accompanying drawings for the brush-contact, serving the contact ring. Each series of contact means may be set in a separate, exchangeable contact ring, which permits substitution of programs or timing schedules of any other process, as the operator may desire.

The expedient of employing a multiplicity of programmed series of contact means, set in separate concentric circles, each provided with its own counter-contact means, may also be adapted for the multisequence timer, described hereinbefore. To provide for the phased or delayed starting time, each set of contact means (which in this case are all programmed for the same identical process) is off-set from the preceding in clockwise direction by an angle, corresponding to the desired delay time. Setting each set of programmed contact means into a rotatable contact ring, permits the operator to set any desired delay time for each succession of treating steps, even after starting the preceding succession of treating steps.

The just described most versatile embodiments of the multiprocess program timer of the invention with the exception of the last described embodiment relating to the operation with a single signal source, have the only disadvantage that they are not readily capable of adding the programs of new processes which may be provided in future by the manufacturers of photographic materials and the processes required for the treatment of new photographic materials released in future. It is likewise not flexible enough to be readily adjusted in the event, that the manufacturer of a given photographic material changes the process schedule i.e. the number of steps or the duration of any one or more of the steps even slightly. Such changes of programming may be made in the fixedly programmed timers only by relocating the contact means as is needed, which means by actually rebuilding the timer.

These inconveniences may be readily avoided by the use of still another embodiment of the multiprocess timer which will be described hereinafter, and which permits readily the adaptation of the program timer for the control of any desired number of different multistep photographic treating processes including any new or modified processes released at a time after the manufacture of the program timer proper without sacrificing the accuracy, reliability, consistency and other advantages of the fixed program setting of the contact means in the dial face.

This embodiment of the program timer is characterized by the provision of a multiplicity of individual, exchangeable dial assemblages with one program timer, each containing a series of fixed contact means corresponding in number and spacing to the process for which each dial face is programmed. The dial faces are removably mounted and mutually exchangeable in the timer and may be simply substituted for each other. In this manner the operator need only purchase those dial faces which are programmed for the processes which he wishes to control or time by the program timer and he may subsequently purchase any additional dial faces which are programmed for any additional processes he wishes to use or for any new or modified processes, provided by the manufacturer of the photographic material, he employs or wishes to employ.

FIGS. 12 to 16 of the accompanying drawings depict a representative embodiment of the program timer, having the exchangeable dial assemblage. Rectangular housing 250 comprises bottom 251, narrow sides 253 and 254, removable back 255 and front 256 from which U-shaped section 256a has been cut out. Vertical support 258 extends over the whole width of the housing and is joined at the lower end to the bottom 251 of the timer. The upper free edge of support 258 is joined at a right angle to top section 259 which in turn is removably fastened to the back 255 and sides 253 and 254, to form a closed chamber. Clockwork 257, which is preferably an electric synchronous motor of 1 or 2 r.p.h., depending on the total duration of the longest process to be programmed and timed, is mounted inside this chamber on vertical support 258. Shaft 260 of the clockwork extends and projects horizontally through the center 261 of dial assemblage 273, contained and inserted in the front 256. The free end of shaft 260 is adapted to receive hand 262. Hand 262 is fixedly joined to disc 268, which fits slideably over the free end of shaft 259 of clockwork 257 and which is secured to the shaft by set screw 269. Electric battery 263 is mounted on bottom 251 of housing 250 inside the closed chamber. The minus pole of the battery is conductively connected to the housing and shaft of the clockwork as described hereinbefore. Multicontact socket 264 with female contacts 266 and female contact 267 is mounted on top 252 of the housing. Plug 265 with male contacts 266a and male contact 267a is adapted to be removably plugged into socket 264. Each one of male contacts 266a is conductively connected by separate wires 286 to one terminal of one of the bulbs contained in a multibulb arrangement or light bar as described hereinbefore, the number of female contacts 266 in socket 264 and of male contacts 266a in plug 265, respectively, being at least equal to the total number of bulbs controlled by the timer, Male contact 267a in the plug 265 is conductively connected to the second terminal of all the bulbs and the corresponding female contact 267 in the socket 264 is conductively connected over switch arrangement 270 and 271 to the plus pole of the battery.

The front of housing 250 is composed of two separate parts. Front 256 which has a U-shaped section cut out in its upper portion is, as stated, joined to and forms an integral part of housing 250. Removable dial assemblage 273, carrying dial 280 is also U-shaped and fits removably into the U-shaped void provided in front 256. Horizontal top 252 is fixedly joined to the top edge of removable section 273 and extends at a right angle back over the open top of housing 250 which is closed and covered by top 252 when section 273 is inserted in the housing. Dial 280 is made of an insulating material and contains contacts 274, which are set in a concentric circle around the dial, corresponding in number and spacing to the sequence of the steps of the process to be timed as described hereinbefore in detail. Each contact is conductively connected to one of the female contacts 266 of socket 264 so as to connect, when plug 265 is inserted, each of the contacts 274 with the bulb which is to be controlled by the respective contact. Counter contact 275, mounted at the free end of hand 262 makes and breaks contact between the hand 262 and the contacts 274, closing and opening the primary circuit, lighting the bulbs in succession as the hand rotates around the dial as was described hereinbefore in detail.

Dial assemblage 273 has in its lower portion vertical central slot 276 slightly wider than shaft 269, starting at bore 261 and extending downward to the lower edge of section 273 where it is open. The provision of slot 276 makes it possible to insert or remove dial assemblage 273 with top 252 and socket 264 by simply sliding it downward or lifting its vertically upward, respectively, without the need for removing hand 262 and/or clockwork 257.

A given program timer may be provided with any desired number of such programmed dial assemblage of like dimensions and constructions i.e. comprising U-shaped section 273, top section 252, socket 264, dial face 260 with contacts 274 and slot 276. Each dial assemblage is programmed for a different photographic treating process. The number and angular spacing of the contacts 274 in each of the programmed dial assemblage is in accordance with the exact requirements of the process for which it is designed. To change from one process to the next, the operator simply removes the dial assemblage and inserts the one corresponding to the process he wishes to carry out.

Simply inserting the new dial assemblage and plugging in plug 265 establishes all the required electrical connections and puts the program timer in condition for operation, if housing 250 and horizontal top 252 of the dial assemblage 273 are made of an electrical conductor to which female contact 267 is conductively connected. If housing 250 and/or top 252 are made of an insulator, such as of plastic, the same convenience is possible by the provision of a switch arrangement comprising contacts 270 and 271. Contact 270 is fastened to the right side 254 of housing 250 and cooperating contact 271 is fastened on the lower inside of top 252 opposite contact 270, so that both contacts touch each other when the dial section 273 is inserted in the program timer. Contact 270 is conductively conencted to the plus pole of battery 263 and contact 271 is conductively connected to female contact 267 of socket 264. Thus, with the dial section 273 inserted into the housing, electrically conductive connection is established between the plus pole of the battery and contact 267 of socket 264.

Socket 264 may advantageously be modified by the provision of a second female contact 267 on the left side of like size and in the corresponding position, so as to permit reversal of plug 265. This expedient permits the use of the light bar, which is conductively connected to plug 265 in either direction i.e. in left-to-right or right-to-left direction, as described hereinbefore, thus providing more flexibility in the setting up of the equipment and permitting the operator to run the photographic material through the successive treating baths from the left to the right, or from the right to the left, as he may choose, with a given light bar and timer.

Figures 14, 15, 16:
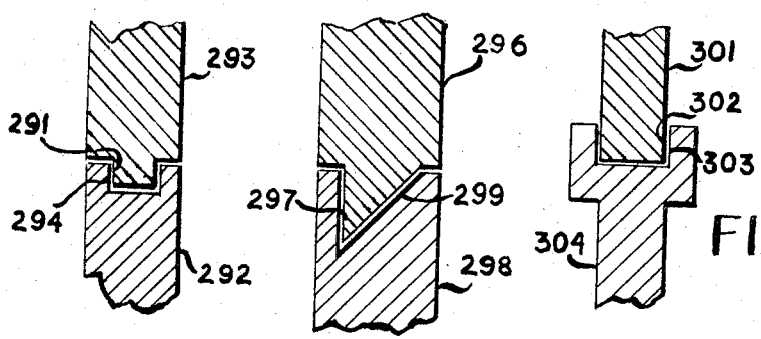
FIGS. 14–16 represent sections of tongue and groove arrangements which may be used with advantage in the construction of the embodiment of the timer having the exchangeable dial or face.

To assure good fit and firm positioning of the dial assemblage in the U-shaped front of the housing, various groove and tongue arrangements may be employed with advantage, such as those shown in FIGS. 14 to 16. Any other known means facilitating the insertion and securely holding the dial assemblage 273 in the front of housing 250 may likewise be used.

Figures 12, 13:
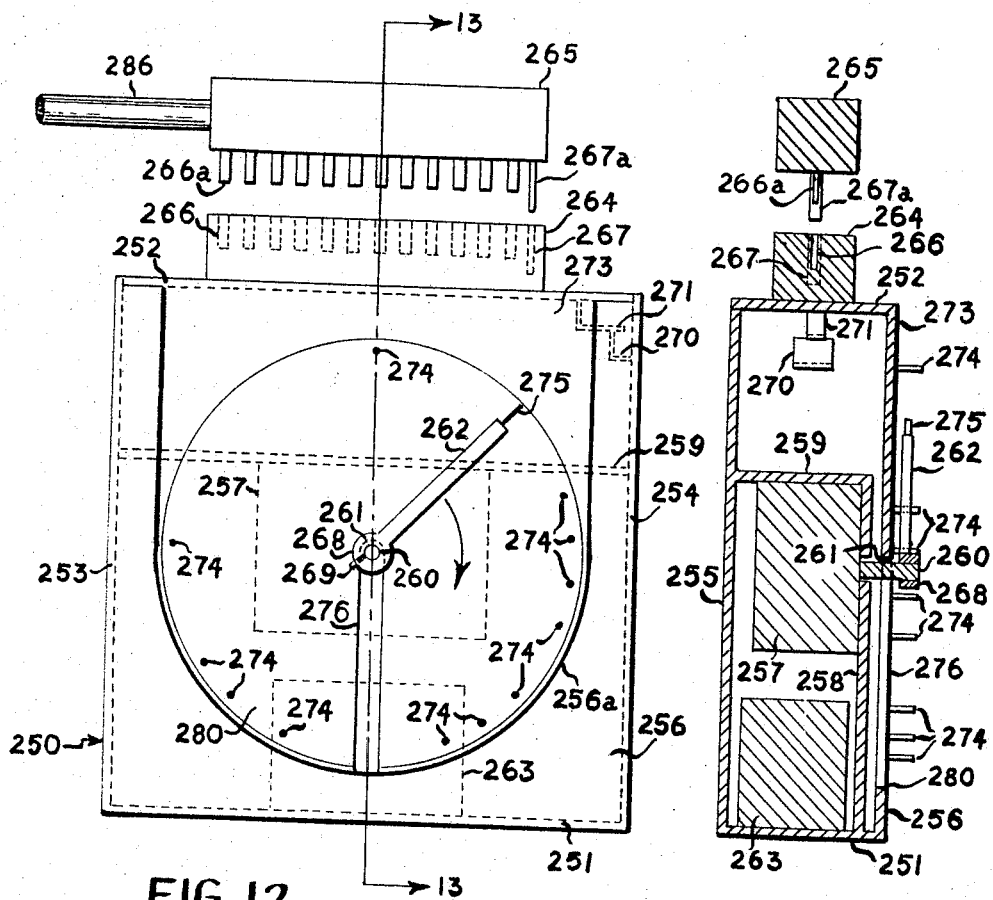
FIG. 12 is a front elevation of another embodiment of the program timer of the invention having an exchangeable dial or face assemblage and FIG. 13 is a vertical section thereof taken along line 13—13 of FIG. 12.

FIG. 14 is a fragmentary section of an exchangeable dial assemblage 293, having rectangular tongue 291 contained in rectangular groove 294 which is provided in front 292, forming in turn part of a timer housing. Groove 294 is adapted to snugly receive tongue 291. FIG. 15 is a fragmentary section showing another embodiment of a dial assemblage 296, having a triangular tongue 297 inserted in triangular groove 299, contained in front plate 298. FIG. 16 is likewise a fragmentary section, taken across the front of a multiprocess program timer of the kind illustrated in FIGS. 12 and 13, illustrating still another embodiment of the joint. Front 304 is provided along the U-shaped inner edge with groove 303 which is formed by widening the free edge of wall 304. The width of groove 303 is adapted to receive the free edge 302 of dial section 301 which slides into the groove all around its U-shaped edge.

Depending on the closeness and accuracy of the fit of the dial assemblage in the front of the housing, it may become desirable to provide in addition means which permit locking of the dial assemblage in the housing so as to avoid accidental shifting or inaccurate seating of the dial assemblage in the housing. Any of the known means for accomplishing the locking may be employed such as locking pins operating with or without spring load. The pin is advantageously adapted to be inserted only when the dial assemblage is in complete alignment with the housing. Other locking means such as levers and hooks or brackets provided at the side or top of the housing may be used with equal advantage.

The program timer of the present invention having the exchangeable dial assemblage, has been described hereinbefore in its simplest version employing the contact and counter-contact arrangement. Any other suitable contact means may likewise be employed, particularly also the various types of contact means and counter-contact means which will be described hereinafter. The dial face may have provision for manual or automatic prolongation of one or several of the steps by a predetermined length of time as described hereinbefore. The multicounter-contact arrangements permitting the simultaneous timing of several batches of material treated sequentially in overlapping fashion described hereinbefore, may be readily adapted for the incorporation in this embodiment of the multiprocess timer. The auxiliary acoustical prewarning arrangement may likewise be adapted and incorporated in the dial assemblage. The hands or discs, if such are used, carrying the counter-contacts, are advantageously joined to the shaft of the clockwork over a ratchet assemblage so as to permit the setting of the timer to or close to the starting position by rotary adjustment of the hand or disc relative to the shaft. Instead of providing multiple signal sources one may also employ the single visual or acoustical signal source as may be desired. In this case the plug and socket are not required, and the timer may be simplified in many respects, as is apparent from the above description of the single signal source timer of this invention.

The exchangeable dial sections described hereinbefore, may be stored in a rack provided as a separate device, or more advantageously as part of the program timer. The rack has a hight and width similar to that of the timer and contains advantageously a multiplicity of horizontal guide means of a design and dimensions corresponding to those used in the timer, so as to readily receive the exchangeable dial assemblages for storage. A multiplicity of the U-shaped sections is inserted in parallel arrangement either vertically or horizontally at a spacing which corresponds at least to the depth of top section 252. When the dial face sections are inserted in this rack, they are securely held in place in suitable guide means e.g. by the utilization of a tongue and groove arrangement as is used in the program timer itself. The top section 252 form a continuous top area. The sides, the back, the front and the bottom of the rack are advantageously continuous wall sections, thus forming a closed box with top sections 252 in which the dial face sections are protected against damage and dust.

Various other embodiments of contact means, providing the convenience of the timing of the drainage period are shown by way of example in FIGS. 17 to 21. The invention is however not limited to the use of any one of the contact and counter-contact means specifically described herein. Referring to FIGS. 17 and 18, contact 301 is recessed in dial 302 of the program timer, so as to be flush with the front of the dial face, and held by threaded tail and nut 306. Nut 307 permits connection of the contact by wire with the signal source. Hand 303 carries at its free end contact spring 304, the free end of which travels in a circle, having a radius substantially equal to the distance of contact 301 from the center of the dial face or shaft respectively (not shown). Accordingly, contact 301 is curved being a section of the circle so as to permit the vertical free end of contact spring 304 to slide over contact 301 as it travels around the dial. The peripheral width of contact 301, expressed as the angle α in degrees, is calculated by dividing the desired number of seconds contact time or drainage time by 10 times the number hours, required for one revolution of the hand. For a 20 seconds drainage time, with the use of a 1 r.p.h. clockwork, α is 2°. For a 60 seconds contact time, and with the use of a 2 r.p.h. clockwork, α is 3°. The value thus calculated is to be corrected by subtracting the width of the inner contact surface of spring 304.

FIG. 19 is a fragmentary plan view of a dial, containing another embodiment of the contact means which may be used with advantage in the program timer of the present invention. Contact 310 is shown in the 12 o'clock position of the dial and is mounted by threaded tail end 311 and nut 312 on the front side of dial 313. Nut 314 serves to connect and hold a wire which conductively connects contact 310 to the coordinated signal source. Contact 310 is wedge-shaped with the pointed side mounted on that side on which contact spring 315, contained at the free end of traveling hand 316, traveling in the direction of the arrow, makes contact. The pointed end of the wedge is slightly rounded off so as to provide for instantaneous positive contact. The blunt end of the wedge on the far side of the wedge assures instantaneous break of the circuit.

Another most advantageous embodiment of the contact means is depicted in FIGS. 20 to 23 of the accompanying drawings. Contact plates 330 of an electron conducting material are arranged in a circle around and set in the front of dial 331. The number of said contact plates equals the number of steps to be timed plus one. The dial, illustrated in FIG. 20 is shown programmed for the Kodak Color Film Process C–22. The drainage times are 20 seconds and the duration of the signal, indicating the start of the first step, is one minute. The radial spacing and the spacing of the contact plates 330 from each other is not critical and need only approximately be that required by the timing cycle to be programmed, because their radial length and peripheral width greatly exceeds the dimensions actually required for the timing of the holding and forwarding times. Each of the contact plates 330 is conductively connected to a terminal 340 provided on the rear of dial 331. The terminals in turn are conductively connected to the signal sources as described hereinbefore.

Contact plates 330 are held and fastened in the dial face by lugs 341 which are projecting through openings 342 in the dial 331. The free ends of lugs 341, projecting at the rear of the dial face, are tightly laid against the rear side of the dial face so as to securely hold the contact plate in place.

FIG. 23 is a plan view of a blank of a contact plate 330 with lugs 341 and terminal 340 shown in the original position. For mounting the contact plate 330 in the dial face, perforations 342 of a size and locations to accommodate the lugs and terminal in the desired position are first punched into a sheet of insulating material used as the dial. Lugs 341 and terminal 342 are then bent backward at approximately a right angle with the body of contact plate 330. After inserting the lugs and terminal through the respective perforations 342 in the dial sheet, the free projecting ends of the lugs are bent and pressed toward the rear of the dial sheet so as to assure tight fit of the contact plate 330 in the dial face. By carrying out the operation in a press and applying sufficient pressure, contact plate 330 may be partially or fully recessed into the face of the dial, if this is desired.

The exact timing cycle is provided by the programmed circular disc 333, made of an insulating material which is superimposed on contact plates 330 mounted on the front of the dial by help of screws 332 and nuts 332a. Programmed disc 333 has around its outer periphery a series of perforations 334, arranged in a circle, concentrically to the periphery of disc 333. The diameter of the circle in which perforations 334 are located is equal to the distance of the traveling counter-contact means 336 (FIG. 22). Each perforation is a narrow sector, having a peripheral width expressed in degrees as calculated for the desired drainage time by the equation given hereinbefore. The perforations are located and spaced from each other at a radial angle, corresponding exactly to the time interval desired for each process step to be timed by this contact. As shown in FIG. 22, hand 335 is provided at its free end with a brush counter-contact 336, which is pressed against the dial face by the force of spring 337 and which is held and conductively connected to hand 335 by pin 338 resting slideably in bore 339 of the head 345 of the hand. The hand is mounted on the shaft of a clockwork (not shown) which turns the hand clockwise around the dial face.

The counter-contact 336 is, as stated, mounted on the hand 335 at a radius corresponding exactly to the radius of the circle in which the perforations 334 are provided in programmed disc 333. As the hand travels around the face, counter-contact 336 slides over disc 333 of insulating material. The circuit actuating the signal source is thus open and no current flows. As the hand proceeds and counter-contact 336 reaches one of perforations 334 it contacts the contact plate 330, lying exposed under the perforations 334, thus closing the circuit and actuating the signal source connected to the particular contact plate. The circuit will be opened as the traveling counter-contact reaches the far side of the perforation, breaking the contact with contact plate 330, as it continues its travel on the surface of insulating disc 333. The signal stops (i.e. in case of a light signal, the light extinguishes), indicating the begin of the next treating step. When the counter-contact 336 reaches the next perforation, it will make contact with the next contact plate 330 in line and close the circuit of the signal source connected to this contact plate. When it has reached the far end of the perforation the circuit is opened and the signal stops and so forth until all steps of the process have been indicated by the timer. Instead of using contact plates 330, one may also employ in their place contact means of the type shown in FIG. 18, but made larger than required in FIG. 18.

Referring to FIG. 22, slideable pin 338, holding counter-contact brush 336 has at its free end, head 346 which serves as a handle, permitting the operator to pull pin 338 and counter-contact 336 outwardly and away from the dial. Lever 347 is pivoted to pin 338 by hinge 349. After pulling pin 338 outwardly, lever 347 is laid down on pin 338 so that its free end engages in catch 350. By this expedient counter-contact 336 may be disengaged from the dial and fixed in this position. Vice versa, raising lever 347 to the position shown, permits the spring 337 to engage counter-contact 336 against the dial thus activating hand 335, so as to permit its controlling the signal sources, as it travels around the face of the timer.

As is readily seen, the just described arrangement can be used with particular advantage in the multihand or multicounter-contact disc arrangements, described hereinbefore in place of the electric or mechanical switches as the means for activating or inactivating any one or more of the counter-contact means. The arrangement may be readily adapted to be used also with the hereinbefore described pin-tongue contact arrangement, or with any of the other combinations of contact and counter-contact means useful in the timer of the present invention.

The embodiment of the dial assemblage, employing the contact plate and superimposed program disc arrangement is preferred, because it can be readily and economically manufactured from simple and inexpensive parts and materials by readily available mass production methods, without sacrifice in accuracy and reliability. They may with particular benefit be incorporated in the design of the exchangeable dial assemblage, because of the need for making economically large numbers of dial assemblages, programmed to the various, different photographic processes, required to accommodate the large number of different photographic materials on the market including the color positive and negative films and paper base materials of the many different makes. The body of the dial may be made from an inexpensive nonconductive material, such as glass, wood or plastic. The contact plates may be inserted by automatic punching machines. As stated, this operation requires no particular accuracy nor precautions, because the positioning of the contact plates 330 is not critical as long as they are substantially larger and wider than the perforations 334 and as long as they do not touch each other. Programmed disc 333 may be simply stamped out from thin sheets of an insulating material, preferably of plastics. The cutting of the disc, of the perforations and of the holes for screws 332, is conveniently carried out in one step by the use of suitably designed cutting and punching tools. This assures highest accuracy of the relative position of the perforations to each other and to the center or periphery of the disc. When the disc is mounted on the front of dial 331, the programmed timing cycle will be absolutely accurate, because the relative spacing of the perforations 334 is fixed by the design of the dye, used in the stamping.

FIGS. 20 and 21 show another embodiment of the exchangeable dial assemblage useful in the timer of the present invention and incorporating the principle of the just described perforated disc contact plate arrangement. The contact plates 330 and programmed disc 333 are mounted on the front of rectangular face 350 in the manner described hereinbefore. To the top edge of face 350 is joined rectangular top 351, shaped and dimensioned such that it fits into and covers the open top of the housing of the timer for which the assemblage is made. Top 351 is further supported by triangular supports 352. Socket 353 is recessed in top 351. Its construction and function is similar to that described hereinbefore, permitting convenient conductive connection or disconnection of the contact plates to their coordinated signal sources, when the dial assemblage is inserted in or removed from the timer. Around the sides and bottom edge of base 350 is provided tongue 356. Vertical slot 354, which is open at the bottom, extends from the center bore 355 downward to the lower edge of face 350 and tongue 356, permitting ready insertion of the dial assemblage into the front of the timer, as described hereinbefore.

Tongue 356 fits into a groove provided around the sides and bottom of the timer for which the exchangeable dial assemblage is made. The operation of the timer, with this embodiment of the exchangeable dial assemblage inserted is very similar to that described hereinbefore.

The auxiliary acoustical signal source giving advanced warning of the approaching end of a treating step may be conveniently included in the design of the dial face made in accordance with the just described principles. A second smaller circle of perforations (not shown), programmed on disc 333, underlayed with ringlike contact means and a cooperating second counter-contact mounted under hand 335 may be provided and arranged as described hereinbefore. Since only one signal source is required to be actuated, the perforations in the second circle are underlayed by a single full ring of a metal contact plate, mounted concentrically to the shaft by the clockwork being broken only at the position of slot 354. The ring is connected to one terminal of the acoustical or other signal source which is actuated every time the counter-contact means engages with that portion of the contact ring which is exposed by a perforation. The number of perforations and their relative spacing expressed in degrees is the same as that for the perforations controlling the individual light signals. However, to actuate the prewarning signal by a predetermined time prior to the end of the processing step, this series of perforations is advanced slightly counter-clockwise, relative to the former series of perforations, or alternatively, the counter-contact on the hand is proportionately advanced in the direction of the rotation of the hand. The length of each perforation in the second series is adjusted to provide the desired length of the actuation of the signal source, e.g. one second or a few seconds or ten seconds or more as may be desired.

Instead of designing this embodiment of the program timer for the use with the light bar or a multiplicity of individual light sources as just described and illustrated, it may also be adapted to be used with a single signal source. In this embodiment a single contact ring, conductively connected to the signal source, is substituted for the multiplicity of individual contact plates 330.

Instead of providing the preformed programmed disc 333 shown in the drawings, the exposed contact areas may simply be produced by painting or printing onto the contact plates, an insulating coating such as of insulating lacquer or paint, sparing only those areas which correspond to the perforations in the programmed disc 333. Conveniently the perforations may be provided by simply printing onto the contact ring or contact plates the desired pattern of insulator after the contact plates or rings have been inserted into and fastened to the base.

The contact plates 330 or the contact rings may be fastened to the base 350 by any other desired method e.g. by the use of rivets, screws, adhesives or other means known per se. Any of the fastening means may serve directly as the terminal for conductively connecting to the individual contact plates or contact rings conductive wiring. The wiring may also be applied in usual manner over suitable lug or screw terminals, provided on the back of the dial in conductive connection with each contact plate or contact ring. If the programmed disc 333 or its equivalent are made from heavier, thick materials, it may be of advantage to level the radial edges, so as to facilitate the sliding of the counter-contact into and out of the exposed contact area. Similar benefits may be derived from the substitution of a rotatable contact means for the sliding type.

Instead of using a single hand with one counter-contact means the multiple hand arrangement or a rotating disc with a multiplicity of counter-contact means may likewise be used with or without switching means as described hereinbefore as to permit, simultaneously phase processing of more than one batch of photographic material by the same process and time schedule in overlapping succession.

The various embodiments of the program timer described hereinbefore have one single dial, which is either permanently or exchangeably mounted on the front or inside the timer to permit use of the timer for varying processes, having different time schedules and steps. Built-in multiprocess operation is also possible in an embodiment of the timer in which a multiplicity of independent dials, each with its own coordinated counter-contact arrangement is permanently provided in the timer. Each dial contained therein is programmed for a different process. Ganged multiposition rotary switches or other means, permitting the conductive connection or disconnection of the contacts contained on any one of the dials, to the respective signal source may be provided. More advantageously, however, one may employ the simpler switches or other means, permitting the activation or deactivation of the cooperating counter-contact means on the hands or rotating discs so as to permit convenient selection of any one of the process schedules, programmed on the various dials contained in the timer by throwing a single switch. Conveniently, one separate hand or multihand arrangement or a rotating disc, each containing one or more counter-contact means, as may be desired, is provided on each dial. All hands or rotating discs, serving the various dials, are conveniently mounted on a common shaft, driven by a single clockwork.

All the embodiments of the program timer described hereinbefore employ a plane dial and a suitable hand- or disc-counter-contact arrangement, sweeping or rotating over the dial face. The same benefits and ease of operation may be achieved in still another embodiment of the program timer, in which the contact means are mounted on one of the cylindrical surfaces of a cylindrical or tubular member. As will be shown hereinafter, this embodiment of the timer is particularly adapted for the selective control of a large number of different processes. The contact means may be mounted, for instance, on the inside of a stationary tubular member with the counter-contact means mounted on a suitable support, which is contained rotatably within said tubular member and which is rotated by the shaft of a clockwork. The outer tubular member is advantageously made of an insulating material. A multiplicity of series or sets of contact means, each series corresponding to and programmed for a different process, are provided in separate circles around the inner surface of the tube. All the contact means, controlling the step of the same number in each process, are conductively connected to the coordinated signal source, controlling this particular step. Each circular set or series of contact means may be provided with its own cooperating rotating counter-contact means, each of which is conductively connected to the source of electricity over a suitable switch, permitting the activation of any one of the counter-contact means and thus of the set of contacts, cooperating therewith. Thus, only the sequence of impulses, controlling the particular selected process for which the set of contact means is programmed, are produced at any one time.

Alternatively, and more advantageously, only one unit of one or more counter-contact means is provided. By mechanical shifting and relocation, in the direction of the cylinder axis of the support, on which the counter-contact means are mounted, the counter-contact means may be placed opposite any one of the sets of contact means, thus utilizing any one of the programmed time schedules for the timing of the desired process.

Instead of providing the sets of contact means on the inside of the tubular member, they may also be provided on the outside of the cylindrical member. In this embodiment of the program timer, the cylindrical member is advantageously rotatably mounted, and rotatably driven directly or indirectly by the clockwork. The counter-contact means are made stationary and conveniently supported on the base or on a supporting structure, surrounding said rotatable cylinder. Conveniently, the counter-contact means may be provided on the inside of a second tubular member, having a somewhat larger diameter than the first rotating cylindrical member. The said second stationary tubular member is placed coaxially and concentrically around the first cylindrical member, containing the set or sets of programmed contact means. A multiplicity of stationary counter-contacts may be arranged in predetermined spacing around the rotating cylinder so as to permit the simultaneous phased timing of more than one batch of photographic material in the manner as described hereinbefore. Any desired number of sets of contact means, programmed for a multiplicity of different photographic processes may be provided on the cylindrical member in ringlike fashion, as described hereinbefore. Alternatively, the cylindrical carrier means, containing the contact means, may be stationary and the tubular member, carrying the counter-contact means, is made to rotate.

Instead of providing the programmed contact means on a circular dial or on the inside or outside of a cylinder, they may also be mounted on an endless belt, which is supported by two rotatable rolls and driven at a predetermined constant rate by the clockwork, so that the contact means move by the cooperating stationary counter-contact means.

The contact means may also be mounted in a plane and in a straight line, with the counter-contact means moving at a predetermined uniform rate over the series of programmed contact means, providing the signals for the timing of the process as described hereinbefore. In this embodiment, the counter-contact means may conveniently be mounted on a traveling belt or on a reciprocating sliding support.

In another embodiment of the timer, both the contact means and the counter-contact means are stationary placed opposite each other, so that they may readily engage and close the primary circuit. The schedule of timed signals is brought about by rotating or moving at a predetermined uniform rate an insulator, having a multiplicity of perforations programmed to the desired process or processes, in the plane between the contact means and the counter-contact means. The primary circuit is thus open, as long as the insulator travels between the contact and counter-contact means. The primary circuit is closed, when one of the perforations falls between the contact and counter-contact means. The series of impulses, generated in this manner, may serve to control the automatic forwarding of the photographic material from step to step or to generate a timed succession of signals as described hereinbefore.

All the embodiments of the timer described hereinbefore employ at least one electrical circuit as the means for controlling the actuation of the signal source. This was found to be the most preferred design and construction. However, if desired the system of contact and counter-contact means may also be used to directly control a signal source, such as a springwound bell by mechanical means only. In this instance the counter-contact means are advantageously integrated with and made a part of the signal source. However, as is readily apparent, this embodiment of the timer is not only less accurate, but lacks also the versatility of the embodiments of the timer, employing one or more electric circuits for the control of the signal source or signal sources.

As stated hereinbefore, the impulse generated by the engagement and/or disengagement of the contact means and counter-contact means may also be utilized in the timer of the invention for the control of a secondary electrical circuit, which in turn actuates the signal sources or forwarding means, as the case may be. Relays or similar components may be employed with advantage. Relays generating one or several delayed impulses, may be used to control the acoustical prewarning signal and/or the drainage times.

Instead of indicating the termination of a step by the appearance of the light signal, the light signal may also be on during the duration of the treating step, and the material is forwarded to the next step, when the light signal disappears. However, this mode of operation is less convenient and less versatile and therefore recommended for application only in special circumstances.

The clockwork employed in the program timer of the present invention may be a spring actuated mechanical device or more conveniently of the type, containing an electric motor, such as the synchronous clockworks available in the trade. The source of electricity employed as the means for actuation of the signal sources may be of any desired kind. It may be AC or DC. If it is regular current of 110 v. or higher voltage, precautions must be taken to carefully protect all currency carrying parts from inadvertent contact by the operator, to prevent dangerous shock. This may be achieved by enclosing the timer, including all the currency carrying parts such as the contact means, counter-contact means and their carrier means in a well insulated housing. To indicate the relative position of the contact means and of the cooperating counter-contact means, insulated pointers and dummy dials may be provided on the outside of the housing. The pointer is mechanically coupled to the rotating shaft of the clockwork, so as to permit the operator the observation of the progress of the time schedule.

These precautions are naturally not necessary, if the preferred low voltage circuits are employed, having only a few volts e.g. those provided by a dry cell battery, as described and shown hereinbefore or by low voltage transformers, providing currency of 4 to 10 volts or up to 20 volts or so. Even with this, it was found advantageous that all parts of the program timer are enclosed in a housing, so that none of the parts, including the hands and contact means, are subjected to the effects of spilled chemicals or solutions, nor to physical damage by inappropriate handling.

The program timer of the invention has been described hereinbefore as employing a simple clockwork, having a single rotating shaft. The total time required for one full revolution of the shaft is, as stated, advantageously selected such, that it is as long or longer than the total duration of the sequence of processing steps or of the process, programmed on the timer and requiring the longest treating time. As explained hereinbefore, the degree of accuracy achieved in this manner is sufficient for most purposes, and particularly also for the purposes of the amateur photographer, giving excellent control and reproducibility in most of the commonly practiced photographic processes.

The degree of accuracy, achievable in any one embodiment of the timer of the invention may be further controlled by the choice of the design and construction of the contact and counter-contact means, and by the choice of the most suitable diameter of the dial or cylindrical carrier means, or stated in other words by the absolute spacing of the contact means from each other in relation to the time increment, represented by said spacing. On this basis, the most suitable size of the timer, as expressed in terms of radius or diameter, can be readily determined, so as to provide the desired degree of accuracy without the need of bringing the size of the timer out of proportion to its intended use.

If an even higher degree of accuracy is desired, than that achievable by the increase in size of the timer within reason, another expedient may be employed in the design of the timer, which permits a degree of accuracy, which lies within a fraction of a second.

This embodiment of the timer comprises in addition to the described basic contact means and counter-contact means, auxiliary contact means and auxiliary counter-contact means, which both are part of and incorporated in the primary circuit. The opening or closing of the primary circuit is thus controlled by both the basic and the auxiliary contact and counter-contact means. The primary circuit is closed only if both the cooperating basic and auxiliary contact and counter-contact means engage or make contact. If one of them disengages, e.g. if the auxiliary counter-contact means disengages the co-operating contact means, the primary circuit is opened.

In a practical embodiment of the timer incorporating this principle, the auxiliary counter-contact means is contained on an auxiliary hand, which by the use of suitable gears or other means, is given much higher rate of travel, so that each revolution requires a much shorter time, e.g. a time period which is one tenth, one sixtieth or one hundredth or less than that of the basic hand, containing the basic counter-contact means. The auxiliary counter-contact means, contained on the auxiliary hand, cooperates with its own contact means, provided on the dial or cylindrical carrier, independently of the primary contact means, but conductively connected into the primary circuit.

As is readily apparent, the auxiliary contact and counter-contact means engage on each of the many revolutions made by the auxiliary hand, but are not capable of closing the primary circuit and actuate the signal source, unless the primary contact and counter-contact means are engaged at that very moment. The auxiliary contact and counter-contact means serve thus merely as the means to determine more accurately the moment of the closing or opening of the primary circuit. Using a ratio of travel of the primary and secondary counter-contact means of 1 to 10, will increase the accuracy by a factor of 10. A one to sixty ratio of travel will increase the accuracy by a factor of 60 with a given size of the timer.

It can be seen, that in this embodiment the engagement and disengagement of the basic or primary contact and counter-contact means is no more controlling the exact moment of closing of the primary circuit. There is thus no need for accuracy in their design and spacing. On the contrary, to avoid that they become controlling, it is preferred that they are slightly overdimensioned, that is that they are designed such, that they engage with the cooperating counter-contact means slightly before the time that the primary circuit is to be closed. The same applies to the moment of their disengagement, if this is used to produce an impulse for the control of a signal.

The auxiliary contact means is designed such that it remains engaged with the fast traveling cooperating auxiliary counter-contact means for the length of drainage time etc., if this is intended to be timed or controlled by the process timer modified in accordance with the principle. In a dial type embodiment of the timer, in which the auxiliary counter-contact means makes one revolution per minute, the contact means, indicating a twenty second drainage time, has a width, corresponding to a sector of 120°. As can be readily seen, an accuracy corresponding to a tenth of a second may be readily achieved in a small sized dial and without the application of precision production methods in the construction and manufacture of the timer. The expedient of the auxiliary contact and cooperating auxiliary counter-contact means does thus not only provide a higher degree of accuracy but permits the use of inexpensive construction materials and of relatively crude, cost saving production methods without detracting from the intended utility of and the required degree of accuracy in the timer of the present invention.

As stated, in order to avoid interference of the primary and secondary pair of contacts and counter-contact means, they are provided in the dial type embodiment of the timer in an independent circle, larger or smaller than the circles occupied by the primary contact means, as the case may be. In the other embodiments of the timer they will be mounted independently in analogical manner in different planes.

The just described concept of employing the auxiliary contact and counter-contact means arrangement may be incorporated in any of the many embodiments of the timer of the invention described hereinbefore. The modifications and auxiliary means, described hereinbefore may be combined therewith by suitable adaptation of the construction and design of the timer.

As many apparently widely different embodiments of this invention may be made without departing from the spirit and scope thereof, it is to be understood that I do not limit myself to the specific embodiments described or illustrated herein, except as defined in the appended claims.

I claim:

1. A process timer which is preprogrammed to the time schedule of a multistep photographic color developing process, which process comprises a series of treating steps A of differing lengths and alternating with said treating steps A a series of drainage steps B of relatively short duration, said timer comprising at least one track in which contact areas alternate with insulating areas, at least one countercontact adapted to travel over said contact areas in slideable contact, whereby the contact-giving surfaces of the contact areas are located in a plane which is approximately parallel to the plane in which said track is located, said contact areas and said countercontacts being part of at least one primary electrical circuit powered by an electrical power source, such that the engagement of a contact area and of a countercontact complete the primary circuit of which they are a part, and driving means adapted to bring about relative displacement of said tracks and countercontacts at an essentially constant rate, said treating steps A and drainage steps B being programmed on said track in alternation and in the sequence as they occur in said photographic process by giving said contact areas and said insulating areas differing lengths in the direction of relative travel of said countercontacts over the tracks, the lengths of said contact areas and of said insulating areas, respectively, corresponding in succession, to the duration of the individual treating steps A and of the individual drainage steps B in a sequence as they occur in the programmed process, such that either the contact areas or the insulating areas represent the treating steps A and the other kind of areas represent the drainage steps B, whereby the relative travel of said countercontact over said track brings about enagement and disengagement of the countercontact with said contact areas with the change of energization of the primary circuit at the begin and end of each treating step A and of each drainage step B.

2. The timer of claim 1, wherein the contact areas and the insulating areas are approximately located in the same plane.

3. The timer of claim 1, wherein the contact areas have an approximately rectangular shape.

4. The timer of claim 1, wherein the contact areas are a section of a ring.

5. The timer of claim 1, wherein the track comprising the contact areas and insulating areas is stationary.

6. The timer of claim 1, wherein the lengths of the contact areas in the direction of travel of the countercontacts are successively dimensioned to correspond to the duration of the drainage steps B, and the insulating areas have lengths, in the direction of relative travel of the countercontact, which are successively dimensioned to correspond to the duration of the successive treating steps A of differing duration and in the order as they occur in the process.

7. The timer of claim 1, wherein the track of contact areas and insulating areas is at least part of a circle.

8. The timer of claim 1, wherein the track of contact areas and insulating areas is located on the inner or outer periphery of a cylinder.

9. The timer of claim 1, wherein the track of contact areas and insulating areas is located on a travelling belt.

10. The timer of claim 1, which comprises a second track of one auxiliary contact area and one auxiliary insulating area, with a separate auxiliary countercontact cooperative therewith, said contact areas and its cooperation with the countercontact being as described in claim 1, said auxiliary countercontact being adapted to have a relative rate of travel at least 10 times as high as that of the countercontact cooperating with the basic track of contact areas and insulating areas, whereby said auxiliary contact area and its cooperating countercontact are part of at least one of the primary circuits of the basic track, and the auxiliary contact area is dimensioned, in terms of the faster rate of relative travel of the cooperating auxiliary countercontact, to correspond to the duration of the drainage steps B, such that the termination and begin of each step is signalled by the engagement and disengagement of said auxiliary countercontact with its cooperating contact area, whereby the primary circuit is closed only, if the primary countercontact engages with one of the primary contact areas, and if, at the same time, the auxiliary countercontact engages with the auxiliary contact area.

11. The timer of claim 1, wherein the counter-contact is continuously and alternatingly in sliding contact with the contact areas and with the insulating areas, as it travels along the track of alternating contact areas and insulating areas.

12. The timer of claim 1, wherein all contact areas of the track and the countercontact are part of a single primary electrical circuit.

13. The timer of claim 12, which comprises a single signal source wired into the primary circuit, such that the signal source is activated during engagement of the countercontact with any one of the contact areas.

14. The timer of claim 13, in which said signal source is an electrically operated light source.

15. The timer of claim 1, wherein each contact area is part of a different primary electrical circuit, each of which circuits containing one of the said contact areas.

16. The timer of claim 15, wherein each of the multiplicity of different primary electrical circuits comprises its own light source, such that the various light sources are successively activated as each of the primary circuits is temporarily completed upon the successive engagement of the countercontacts with each of the contact areas as it travels along the track.

17. The timer of claim 16, wherein each of the multiplicity of light sources is physically coordinated to the tank, which contains the treating medium for that step, the timing of which it controls.

18. The timer of claim 17, which comprises a multiplicity of countercontacts in spaced relationship and all travelling at an equal rate.

19. The timer of claim 12, wherein the track of contact areas and insulating areas is contained on an exchangeable dial.

20. The timer of claim 19, wherein the exchangeable dial comprises a light signal source.

21. The timer of claim 15, wherein the track of contact areas and insulating areas is contained on an exchangeable dial.

22. The timer of claim 1 which comprises in addition means for translating said engagement and disengagement of the contact and counter-contact means into a perceptible signal.

23. The timer of claim 13 in which the signal source is a light bulb, covered by a safe light filter for the photographic material, the treatment of which is to be timed.

24. The timer of claim 1 which contains a second track of contact areas, independent of the first, and at least one second countercontact area, adapted to cooperate with said second track of contact areas, and wherein the first track of contact areas controls the generation of a light signal in at least one light bulb, and wherein the second track of contact areas controls the generation of an acoustical signal, said acoustical signal being a prewarning signal, which is generated a predetermined short time period prior to the generation of each light signal.

25. The timer of claim 1 in combination with a multiplicity of light bulbs, the number of bulbs being equal to the number of contact areas, contained on said first track and each bulb being controlled by one of the contact means, each light bulb being adapted to be coordinated to the container, in which the step is carried out, which is timed by the contact areas, which controls the signal in said light bulb.

26. The timer of claim 25 in which the light bulbs are contained in a light bar, comprising a housing which is subdivided into a multiplicity of chambers, each chamber containing one of the light bulbs, and each chamber being provided with at least one transparent section, permitting the observation of the light signal generated by the bulb, contained in said chamber upon engagement of the contact means coordinated to said bulb.

27. The timing device of claim 1 in which the electrical power source is a low voltage power source of less than 20 volts.

28. The timing device of claim 14 in which the signal source is a light bulb covered with a safelight filter for the photographic material the treatment of which is to be timed.

29. The timing device of claim 1 in which the track of programmed electrical contact area is mounted on an exchangeable carrier.

30. The timing device of claim 10 in which the track of programmed electrical contact area and the auxiliary contact are contained on a dial-like face, the countercontact is contained on the minute hand and the auxiliary countercontact is contained on the second hand of a clockwork.

31. The timing device of claim 1 which comprises at least one adjuvant contact area and means adapted to activate said adjuvant contact area with the inactivation of the coordinated primary contact area such that the treatment time in the first step is extended without a need for changing the programming of the track of primary contact area.

32. The timing device of claim 1 which comprises in addition means adapted to permit the resetting of the timing device to the starting point.

References Cited

UNITED STATES PATENTS

| | | | |
|---|---|---|---|
| 956,057 | 4/1910 | Eldred | 340—309.4 |
| 1,064,976 | 6/1913 | Lundius | 340—309.4 |
| 1,324,871 | 12/1919 | Adams | 58—21.1 |
| 1,370,059 | 3/1921 | Smith | 340—309.4 |
| 1,506,264 | 8/1924 | Steckel | 340—309.4 |
| 1,545,728 | 7/1925 | Beck | 307—141.8 |
| 1,806,750 | 5/1931 | Fairbain | 340—309.4 |
| 2,085,617 | 6/1937 | Wagner | 340—309.4 |
| 2,124,490 | 7/1938 | Johnson | 340—309.4 |
| 2,553,482 | 5/1951 | Smith | 340—309.1 |
| 2,590,027 | 3/1952 | Mellard | 340—309.4 |
| 2,642,490 | 6/1953 | Capehart | 340—309.1 |
| 2,987,711 | 6/1961 | Palmer | 340—309.1 |
| 3,034,280 | 5/1962 | Sidell et al. | 58—21.1 |
| 3,054,992 | 9/1962 | Zoglio | 340—309.4 |
| 3,132,333 | 5/1964 | Brooke | 340—309.4 |
| 3,131,621 | 5/1964 | Murray | 95—89 |
| 3,165,049 | 1/1965 | Dick | 95—89 |
| 3,152,323 | 10/1964 | Pardee | 340—309.1 |

NEIL C. READ, Primary Examiner.

R. M. GOLDMAN, C. B. PRICE, JR., I. J. LEVIN, Assistant Examiners.